US012560806B2

(12) United States Patent
He et al.

(10) Patent No.: US 12,560,806 B2
(45) Date of Patent: Feb. 24, 2026

(54) DIRECTIONAL ILLUMINATOR AND DISPLAY APPARATUS WITH SWITCHABLE DIFFUSER

(71) Applicant: Meta Platforms Technologies, LLC, Menlo Park, CA (US)

(72) Inventors: Sihui He, Sunnyvale, CA (US); Jacques Gollier, Sammamish, WA (US); Maxwell Parsons, Seattle, WA (US); Babak Amirsolaimani, Redmond, WA (US); Wanli Chi, Sammamish, WA (US); Daniel Guenther Greif, Redmond, WA (US); Renate Eva Klementine Landig, Seattle, WA (US); Xiayu Feng, Kirkland, WA (US); Zhimin Shi, Bellevue, WA (US); Nicholas John Diorio, Duvall, WA (US); Yang Yang, Redmond, WA (US); Giuseppe Calafiore, Redmond, WA (US); Fenglin Peng, Redmond, WA (US); Tanya Malhotra, Redmond, WA (US); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 601 days.

(21) Appl. No.: 17/671,446

(22) Filed: Feb. 14, 2022

(65) Prior Publication Data

US 2023/0176377 A1 Jun. 8, 2023

Related U.S. Application Data

(60) Provisional application No. 63/286,381, filed on Dec. 6, 2021, provisional application No. 63/286,230, filed on Dec. 6, 2021.

(51) Int. Cl.
*G02B 27/00* (2006.01)
*F21V 8/00* (2006.01)
(Continued)

(52) U.S. Cl.
CPC .......... *G02B 27/0093* (2013.01); *G01B 11/22* (2013.01); *G01S 7/4865* (2013.01); (Continued)

(58) Field of Classification Search
CPC .. G02B 27/01; G02B 27/017; G02B 27/0081; G02B 27/0101; G02B 27/0172; (Continued)

(56) References Cited

U.S. PATENT DOCUMENTS

| | | | |
|---|---|---|---|
| 6,400,885 B1 | 6/2002 | Hu et al. | |
| 7,884,977 B2 | 2/2011 | Mori | |
(Continued)

FOREIGN PATENT DOCUMENTS

| | | | |
|---|---|---|---|
| CN | 210323583 U | 4/2020 | |
| CN | 113075793 A | 7/2021 | |
(Continued)

OTHER PUBLICATIONS

Draper C.T., et al., "Holographic Waveguide Head-Up Display with 2-D Pupil Expansion and Longitudinal Image Magnification," Applied Optics, Feb. 10, 2019, vol. 58, No. 5, pp. A251-A257.
(Continued)

*Primary Examiner* — Sultan Chowdhury
(74) *Attorney, Agent, or Firm* — Greenberg Traurig, LLP

(57) ABSTRACT

A directional illuminator for a display apparatus includes a switchable diffuser for tuning a divergence of a light beam illuminating a display panel of the display apparatus. The tunable divergence of the illuminating light beam translates into a tunable exit pupil size at the eyebox of the display apparatus, which may be matched to a pupil size of a user's
(Continued)

eye, thus providing a configurable illumination of the eye pupil. A tiltable reflector in an optical path of the illuminating light beam may be used to shift the location of the exit pupil at the eyebox of the display apparatus.

14 Claims, 13 Drawing Sheets

(51) Int. Cl.

| | |
|---|---|
| *G01B 11/22* | (2006.01) |
| *G01S 7/4865* | (2020.01) |
| *G01S 17/10* | (2020.01) |
| *G02B 6/35* | (2006.01) |
| *G02B 26/08* | (2006.01) |
| *G02B 27/01* | (2006.01) |
| *G02B 27/42* | (2006.01) |
| *G02B 27/44* | (2006.01) |
| *G02F 1/1335* | (2006.01) |
| *G02F 1/29* | (2006.01) |
| *G02F 1/33* | (2006.01) |
| *G02F 1/335* | (2006.01) |
| *G03H 1/02* | (2006.01) |
| *G06F 1/16* | (2006.01) |
| *G06F 3/01* | (2006.01) |
| *G06T 3/4038* | (2024.01) |
| *G06T 7/246* | (2017.01) |
| *G09G 3/00* | (2006.01) |
| *G09G 3/34* | (2006.01) |
| *H04N 23/56* | (2023.01) |
| *H04N 23/698* | (2023.01) |
| *H04N 23/10* | (2023.01) |

(52) U.S. Cl.
CPC ............ *G01S 17/10* (2013.01); *G02B 6/0016* (2013.01); *G02B 6/0031* (2013.01); *G02B 6/0035* (2013.01); *G02B 6/005* (2013.01); *G02B 6/0066* (2013.01); *G02B 6/3518* (2013.01); *G02B 26/0816* (2013.01); *G02B 27/0081* (2013.01); *G02B 27/0172* (2013.01); *G02B 27/0179* (2013.01); *G02B 27/4205* (2013.01); *G02B 27/44* (2013.01); *G02F 1/133504* (2013.01); *G02F 1/133526* (2013.01); *G02F 1/292* (2013.01); *G02F 1/294* (2021.01); *G02F 1/33* (2013.01); *G02F 1/335* (2013.01); *G03H 1/0248* (2013.01); *G06F 1/163* (2013.01); *G06F 3/013* (2013.01); *G06T 3/4038* (2013.01); *G06T 7/246* (2017.01); *G09G 3/002* (2013.01); *G09G 3/3413* (2013.01); *H04N 23/56* (2023.01); *H04N 23/698* (2023.01); *G02B 2027/0105* (2013.01); *G02B 2027/0138* (2013.01); *G02B 2027/0174* (2013.01); *G02B 2027/0178* (2013.01); *G02B 2027/0187* (2013.01); *G06T 2207/30201* (2013.01); *G09G 2310/0235* (2013.01); *H04N 23/10* (2023.01)

(58) Field of Classification Search
CPC ............ G02B 27/0179; G02B 27/4205; G02B 6/0016; G02B 6/0031; G02B 6/0035; G02B 6/005; G02B 6/0066; G02B 6/3518; G02F 1/33; G02F 1/163; G02F 1/292; G02F 1/294; G02F 1/335; G02F 1/133504; G02F 1/133526; H04N 23/00; H04N 23/10; H04N 23/56; H04N 23/58;

H04N 23/698; G06F 3/00; G06F 3/012; G06F 3/013; G06F 3/017

See application file for complete search history.

(56)    References Cited

U.S. PATENT DOCUMENTS

| | | | |
|---|---|---|---|
| 8,086,044 | B2 | 12/2011 | Feng et al. |
| 8,817,350 | B1 | 8/2014 | Robbins et al. |
| 8,878,773 | B1 | 11/2014 | Bozarth |
| 9,230,515 | B2 | 1/2016 | Liu |
| 9,274,597 | B1 | 3/2016 | Karakotsios et al. |
| 9,557,568 | B1 | 1/2017 | Ouderkirk et al. |
| 9,664,824 | B2 | 5/2017 | Simmonds et al. |
| 10,108,014 | B2 | 10/2018 | Vallius et al. |
| 10,217,286 | B1 | 2/2019 | Angel et al. |
| 10,295,723 | B1 | 5/2019 | Lee et al. |
| 10,466,484 | B1 | 11/2019 | Yoon et al. |
| 10,466,779 | B1 | 11/2019 | Liu |
| 10,502,963 | B1 | 12/2019 | Noble et al. |
| 10,527,855 | B2 | 1/2020 | Alexander et al. |
| 10,571,699 | B1 | 2/2020 | Parsons et al. |
| 10,678,116 | B1 | 6/2020 | Lam et al. |
| 10,712,576 | B1 | 7/2020 | McEldowney |
| 10,775,633 | B1 | 9/2020 | Lee et al. |
| 10,782,526 | B2 | 9/2020 | Van Heugten |
| 10,838,132 | B1 | 11/2020 | Calafiore et al. |
| 10,885,843 | B1 | 1/2021 | Lu et al. |
| 10,890,823 | B1 | 1/2021 | Jiang et al. |
| 11,009,737 | B1* | 5/2021 | Matsuda .......... G02F 1/133504 |
| 11,120,728 | B2 | 9/2021 | Nagasaki et al. |
| 11,176,367 | B1 | 11/2021 | Fix et al. |
| 11,393,430 | B2 | 7/2022 | Nagasaki et al. |
| 11,397,465 | B1 | 7/2022 | Mattila et al. |
| 11,428,938 | B2 | 8/2022 | Yaroshchuk et al. |
| 12,061,343 | B2 | 8/2024 | Amirsolaimani |
| 2004/0227838 | A1 | 11/2004 | Atarashi et al. |
| 2006/0146012 | A1 | 7/2006 | Arneson et al. |
| 2007/0103381 | A1* | 5/2007 | Upton ................. H01Q 19/067 |
| | | | 343/909 |
| 2007/0188837 | A1 | 8/2007 | Shimizu et al. |
| 2008/0143820 | A1 | 6/2008 | Peterson |
| 2008/0212161 | A1 | 9/2008 | Valette et al. |
| 2008/0212942 | A1 | 9/2008 | Gordon et al. |
| 2008/0309649 | A1 | 12/2008 | Kojima et al. |
| 2009/0040580 | A1 | 2/2009 | Mukawa |
| 2009/0196460 | A1 | 8/2009 | Jakobs et al. |
| 2011/0234750 | A1 | 9/2011 | Lai et al. |
| 2012/0188467 | A1 | 7/2012 | Escuti et al. |
| 2012/0218481 | A1 | 8/2012 | Popovich et al. |
| 2012/0249957 | A1 | 10/2012 | Shibata et al. |
| 2012/0250980 | A1 | 10/2012 | Gillard et al. |
| 2012/0254369 | A1 | 10/2012 | Gillard et al. |
| 2012/0257005 | A1 | 10/2012 | Browne |
| 2013/0099700 | A1 | 4/2013 | Kreye et al. |
| 2013/0182066 | A1 | 7/2013 | Ishimoto |
| 2014/0037213 | A1 | 2/2014 | Niederberger et al. |
| 2014/0049452 | A1 | 2/2014 | Maltz |
| 2014/0098010 | A1 | 4/2014 | Travis |
| 2014/0232651 | A1 | 8/2014 | Kress et al. |
| 2014/0300966 | A1 | 10/2014 | Travers et al. |
| 2015/0160529 | A1 | 6/2015 | Popovich et al. |
| 2015/0243718 | A1 | 8/2015 | Kwon et al. |
| 2015/0253591 | A1 | 9/2015 | Kato et al. |
| 2015/0323790 | A1 | 11/2015 | Dominici et al. |
| 2016/0029883 | A1 | 2/2016 | Cox |
| 2016/0085300 | A1 | 3/2016 | Robbins et al. |
| 2016/0241892 | A1 | 8/2016 | Cole et al. |
| 2016/0342205 | A1 | 11/2016 | Shigeta et al. |
| 2017/0307886 | A1 | 10/2017 | Stenberg et al. |
| 2018/0045960 | A1 | 2/2018 | Palacios et al. |
| 2018/0046859 | A1 | 2/2018 | Jarvenpaa |
| 2018/0073686 | A1 | 3/2018 | Quilici et al. |
| 2018/0081322 | A1 | 3/2018 | Robbins et al. |
| 2018/0143586 | A1 | 5/2018 | Narducci et al. |
| 2018/0196263 | A1 | 7/2018 | Vallius et al. |
| 2018/0232048 | A1 | 8/2018 | Popovich et al. |

(56) References Cited

U.S. PATENT DOCUMENTS

| | | | |
|---|---|---|---|
| 2018/0237696 A1 | 8/2018 | Tuffin et al. | |
| 2018/0239177 A1 | 8/2018 | Oh | |
| 2018/0275409 A1 | 9/2018 | Gao et al. | |
| 2018/0307048 A1 | 10/2018 | Alexander et al. | |
| 2018/0364487 A1 | 12/2018 | Yeoh et al. | |
| 2019/0041634 A1 | 2/2019 | Popovich et al. | |
| 2019/0075281 A1 | 3/2019 | Hall et al. | |
| 2019/0079292 A1 | 3/2019 | Alexander et al. | |
| 2019/0086674 A1 | 3/2019 | Sinay et al. | |
| 2019/0094981 A1 | 3/2019 | Bradski et al. | |
| 2019/0101757 A1 | 4/2019 | Martinez et al. | |
| 2019/0147564 A1 | 5/2019 | Yuan et al. | |
| 2019/0243134 A1 | 8/2019 | Perreault et al. | |
| 2019/0243209 A1 | 8/2019 | Perreault et al. | |
| 2019/0310456 A1 | 10/2019 | Meng et al. | |
| 2019/0317450 A1 | 10/2019 | Yaroshchuk et al. | |
| 2019/0353906 A1 | 11/2019 | Gollier et al. | |
| 2019/0361241 A1 | 11/2019 | Amitai | |
| 2020/0041787 A1 | 2/2020 | Popovich et al. | |
| 2020/0043398 A1 | 2/2020 | Salazar | |
| 2020/0049996 A1 | 2/2020 | Yan et al. | |
| 2020/0064633 A1 | 2/2020 | Maimone | |
| 2020/0081252 A1 | 3/2020 | Jamali et al. | |
| 2020/0116995 A1 | 4/2020 | Chi et al. | |
| 2020/0116996 A1 | 4/2020 | Lee et al. | |
| 2020/0143741 A1 | 5/2020 | Tsuboi et al. | |
| 2020/0159084 A1 | 5/2020 | Choi | |
| 2020/0174284 A1 | 6/2020 | Chan et al. | |
| 2020/0183159 A1 | 6/2020 | Danziger | |
| 2020/0183174 A1 | 6/2020 | Noui et al. | |
| 2020/0271936 A1 | 8/2020 | Leibovici et al. | |
| 2020/0336645 A1 | 10/2020 | Fukuda | |
| 2020/0368616 A1 | 11/2020 | Delamont | |
| 2020/0371388 A1 | 11/2020 | Geng et al. | |
| 2020/0412965 A1 | 12/2020 | Yoshida | |
| 2021/0011284 A1 | 1/2021 | Andreev et al. | |
| 2021/0041948 A1 | 2/2021 | Berkner-Cieslicki et al. | |
| 2021/0055555 A1 | 2/2021 | Chi et al. | |
| 2021/0191122 A1* | 6/2021 | Yaroshchuk | G02B 27/4205 |
| 2021/0199958 A1 | 7/2021 | Huang et al. | |
| 2021/0199970 A1 | 7/2021 | Huang et al. | |
| 2021/0208389 A1* | 7/2021 | Lu | G02B 27/0093 |
| 2021/0208397 A1 | 7/2021 | Lu et al. | |
| 2021/0209364 A1 | 7/2021 | Park et al. | |
| 2021/0215856 A1* | 7/2021 | Yu | G02B 3/08 |
| 2021/0223549 A1* | 7/2021 | Maimone | G02B 17/004 |
| 2021/0286178 A1* | 9/2021 | Gollier | G02B 27/0172 |
| 2021/0333402 A1 | 10/2021 | Ronchini Ximenes et al. | |
| 2021/0405374 A1 | 12/2021 | Komanduri et al. | |
| 2021/0405380 A1 | 12/2021 | Urness et al. | |
| 2022/0004001 A1 | 1/2022 | Danziger et al. | |
| 2022/0197376 A1 | 6/2022 | Boyle et al. | |
| 2022/0299754 A1 | 9/2022 | Gollier et al. | |
| 2022/0350219 A1 | 11/2022 | Danziger | |
| 2022/0382061 A1 | 12/2022 | Schultz | |
| 2022/0382064 A1 | 12/2022 | Rohn et al. | |
| 2022/0390744 A1 | 12/2022 | Alasaarela | |
| 2022/0390749 A1 | 12/2022 | Yun et al. | |
| 2022/0394234 A1 | 12/2022 | Etigson et al. | |
| 2022/0397956 A1 | 12/2022 | Lundell et al. | |
| 2022/0413302 A1 | 12/2022 | Meitav et al. | |
| 2022/0413603 A1 | 12/2022 | Held et al. | |
| 2023/0014577 A1 | 1/2023 | Gollier et al. | |
| 2023/0057514 A1 | 2/2023 | Fix et al. | |

FOREIGN PATENT DOCUMENTS

| | | | |
|---|---|---|---|
| CN | 115698819 A | 2/2023 | |
| EP | 2767852 A1 | 8/2014 | |
| EP | 3309602 A1 | 4/2018 | |
| GB | 422680 A | 1/1935 | |
| GB | 2422680 A | 8/2006 | |
| GB | 2585211 A | 1/2021 | |
| JP | 10682851 A | 3/1994 | |
| KR | 20170094350 A | 8/2017 | |
| KR | 20180135646 A | 12/2018 | |
| KR | 20210004776 A | 1/2021 | |
| WO | 2013033274 A1 | 3/2013 | |
| WO | 2018039277 A1 | 3/2018 | |
| WO | 2019178398 A1 | 9/2019 | |
| WO | 2021030093 A1 | 2/2021 | |
| WO | 2021091622 A1 | 5/2021 | |
| WO | 2021242667 A1 | 12/2021 | |
| WO | 2022052949 A1 | 3/2022 | |

OTHER PUBLICATIONS

Palto S.P., "Dynamic and Photonic Properties of Field-Induced Gratings in Flexoelectric LC Layers," Crystals, 2021, vol. 11, 894, 13 pages.

Pogue R.T., et al., "Electrically Switchable Bragg Gratings from Liquid Crystal/Polymer Composites," Applied Spectroscopy, 2000, vol. 54, No. 1, pp. 12A-28A.

Smalley D.E., et al., "Status of Leaky Mode of Holography," Photonics, 2021, 8, 292, 22 pages.

Xiang J., et al., "Electrooptic Response of Chiral Nematic Liquid Crystals with Oblique Helicoidal Director," Physical Review Letters, 2014, 112, 217801, 14 pages.

Zhan T., et al., "High-Efficiency Switchable Optical Elements for Advanced Head-Up Displays," Journal of the Society for Information Display, Mar. 21, 2019, vol. 27, No. 4, pp. 1-9.

International Search Report and Written Opinion for International Application No. PCT/US2023/021926, mailed Sep. 4, 2023, 12 pages.

International Search Report and Written Opinion for International Application No. PCT/US2023/022012, mailed Sep. 1, 2023, 11 pages.

International Search Report and Written Opinion for International Application No. PCT/US2022/051755, mailed Apr. 26, 2023, 9 pages.

International Search Report and Written Opinion for International Application No. PCT/US2022/051781, mailed Apr. 18, 2023, 13 pages.

International Search Report and Written Opinion for International Application No. PCT/US2022/051801 mailed Apr. 14, 2023, 11 pages.

International Search Report and Written Opinion for International Application No. PCT/US2022/051805 mailed Apr. 14, 2023, 10 pages.

International Search Report and Written Opinion for International Application No. PCT/US2022/051814, mailed Jun. 2, 2023, 20 pages.

Aalizadeh M., et al., "Toward Electrically Tunable, Lithography-Free, Ultra-Thin Color Filters Covering the Whole Visible Spectrum," Scinetific Reports, vol. 8, No. 1, Jul. 27, 2018, 11 pages.

Chang A. S. P., "Tunable Liquid Crystal-Resonant Grating Filter Fabricated by Nanoimprint Lithography," IEEE Photonics Technology Letters, vol. 19, No. 19, Oct. 1, 2007, pp. 1457-1459.

International Search Report and Written Opinion for International Application No. PCT/US2022/051388, mailed Apr. 6, 2023, 12 pages.

International Search Report and Written Opinion for International Application No. PCT/US2022/051487, mailed Apr. 11, 2023, 8 pages.

International Search Report and Written Opinion for International Application No. PCT/US2022/051608, mailed Apr. 5, 2023, 11 pages.

International Search Report and Written Opinion for International Application No. PCT/US2022/051751, mailed Apr. 11, 2023, 14 pages.

International Search Report and Written Opinion for International Application No. PCT/US2022/051758, mailed Mar. 22, 2023, 9 pages.

International Search Report and Written Opinion for International Application No. PCT/US2022/051809, mailed Apr. 5, 2023, 10 pages.

Invitation to Pay Additional Fees for International Application No. PCT/US2022/051814, mailed Apr. 11, 2023, 14 pages.

(56)                    References Cited

OTHER PUBLICATIONS

Jolly S., et al., "Near-to-Eye Electroholography via Guided-Wave Acousto-Optics for Augmented Reality," Proceedings of SPIE, vol. 10127, Mar. 2, 2017, 11 pages.

Kollosche M., et al., "Voltage-Controlled Compression for Period Tuning of Optical Surface Relief Gratings," Optics Letters, vol. 36, No. 8, Apr. 15, 2011, pp. 1389-1391.

Lee K. M., et al., "Color-Tunable Mirrors Based on Electrically Regulated Bandwidth Broadening in Polymer-Stabilized Cholesteric Liquid Crystals," ACS Photonics, Sep. 17, 2014, pp. 1033-1041.

Lin I-T., et al., "Electro-Responsive Surfaces with Controllable Wrinkling Patterns for Switchable Light reflection-Diffusion-Grating Devices," Marterials Today, vol. 41, Dec. 2020, 11 pages.

Maimone A., et al., "Holographic Optics for Thin and Lightweight Virtual Reality," Facebook Reality Labs, ACM Trans. Graph. Article 67, vol. 39, No. 4, Jul. 2020, 14 pages.

Shih W-C., et al., "High-Resolution Electrostatic Analog Tunable Grating With a Single-Mask Fabrication Process," Journal of Microelectromechanical Systems, vol. 15, No. 4, Aug. 2006, pp. 763-769.

Sirleto L., et al., "Electro-Optical Switch and Continuously Tunable Filter based on a Bragg Grating in a Planar Waveguide with a Liquid Crystal Overlayer," Optical Engineering, vol. 41, No. 11, Nov. 2002, pp. 2890-2898.

Xiang J., et al., "Electrically Tunable Selective Reflection of Light from Ultraviolet to Visible and Infrared by Heliconical Cholesterics," Advanced Materials, vol. 27, Issue19, May 20, 2015, 5 pages.

International Preliminary Report on Patentability for International Application No. PCT/US2022/051388, mailed Jun. 20, 2024, 10 pages.

International Preliminary Report on Patentability for International Application No. PCT/US2022/051487, mailed Jun. 20, 2024, 7 pages.

International Preliminary Report on Patentability for International Application No. PCT/US2022/051608, mailed Jun. 20, 2024, 9 pages.

International Preliminary Report on Patentability for International Application No. PCT/US2022/051751, mailed Jun. 20, 2024, 12 pages.

International Preliminary Report on Patentability for International Application No. PCT/US2022/051755, mailed Jun. 20, 2024, 7 pages.

International Preliminary Report on Patentability for International Application No. PCT/US2022/051758, mailed Jun. 20, 2024, 7 pages.

International Preliminary Report on Patentability for International Application No. PCT/US2022/051781, mailed Jun. 20, 2024, 11 pages.

International Preliminary Report on Patentability for International Application No. PCT/US2022/051801, mailed Jun. 20, 2024, 10 pages.

International Preliminary Report on Patentability for International Application No. PCT/US2022/051805, mailed Jun. 20, 2024, 9 pages.

International Preliminary Report on Patentability for International Application No. PCT/US2022/051809, mailed Jun. 20, 2024, 9 pages.

International Preliminary Report on Patentability for International Application No. PCT/US2022/051814, mailed Jun. 20, 2024, 16 pages.

International Preliminary Report on Patentability for International Application No. PCT/US2023/021899, mailed Nov. 21, 2024, 9 pages.

International Preliminary Report on Patentability for International Application No. PCT/US2023/021926, mailed Nov. 21, 2024, 10 pages.

International Preliminary Report on Patentability for International Application No. PCT/US2023/022012, mailed Nov. 21, 2024, 9 pages.

Office Action mailed Mar. 12, 2025 for European Patent Application No. 22847298.1, filed on Dec. 4, 2022, 5 pages.

* cited by examiner

400

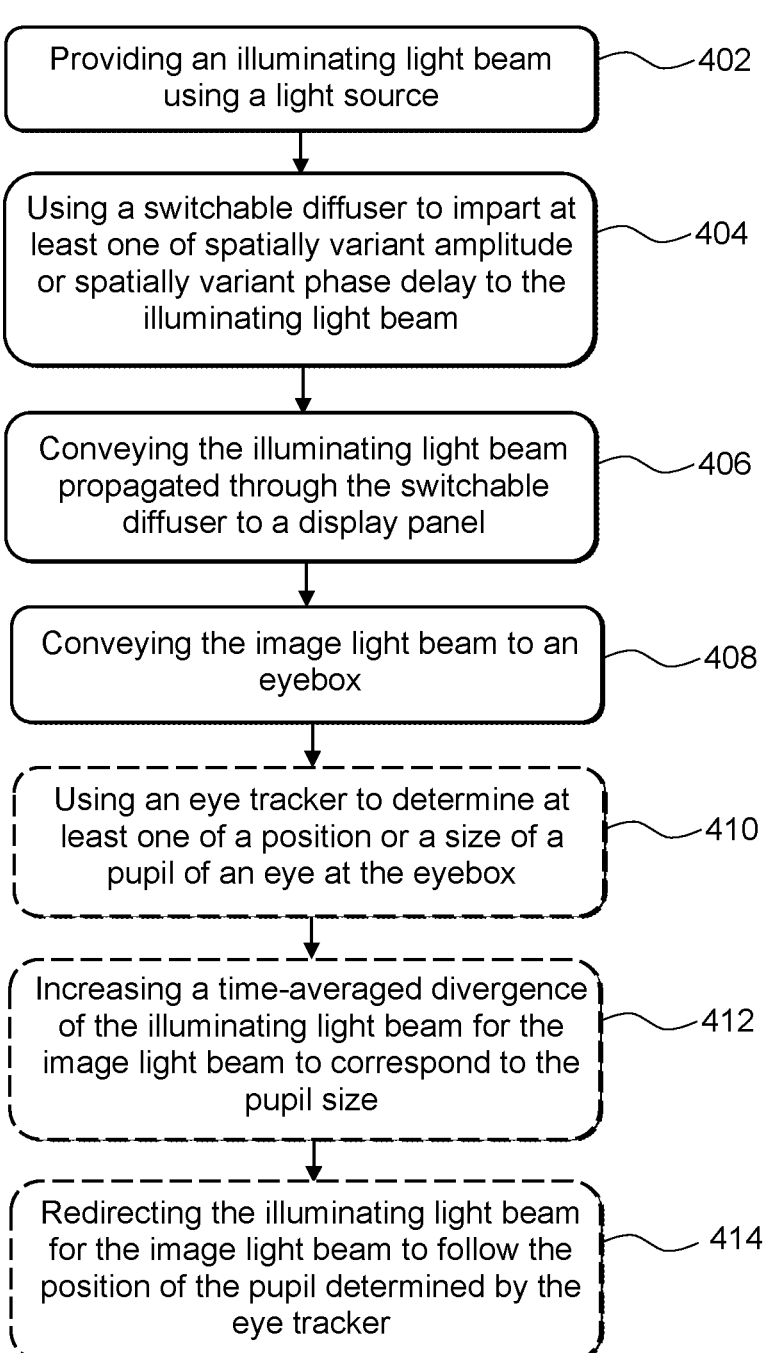

Providing an illuminating light beam using a light source ⟶ 402

Using a switchable diffuser to impart at least one of spatially variant amplitude or spatially variant phase delay to the illuminating light beam ⟶ 404

Conveying the illuminating light beam propagated through the switchable diffuser to a display panel ⟶ 406

Conveying the image light beam to an eyebox ⟶ 408

Using an eye tracker to determine at least one of a position or a size of a pupil of an eye at the eyebox ⟶ 410

Increasing a time-averaged divergence of the illuminating light beam for the image light beam to correspond to the pupil size ⟶ 412

Redirecting the illuminating light beam for the image light beam to follow the position of the pupil determined by the eye tracker ⟶ 414

FIG. 4

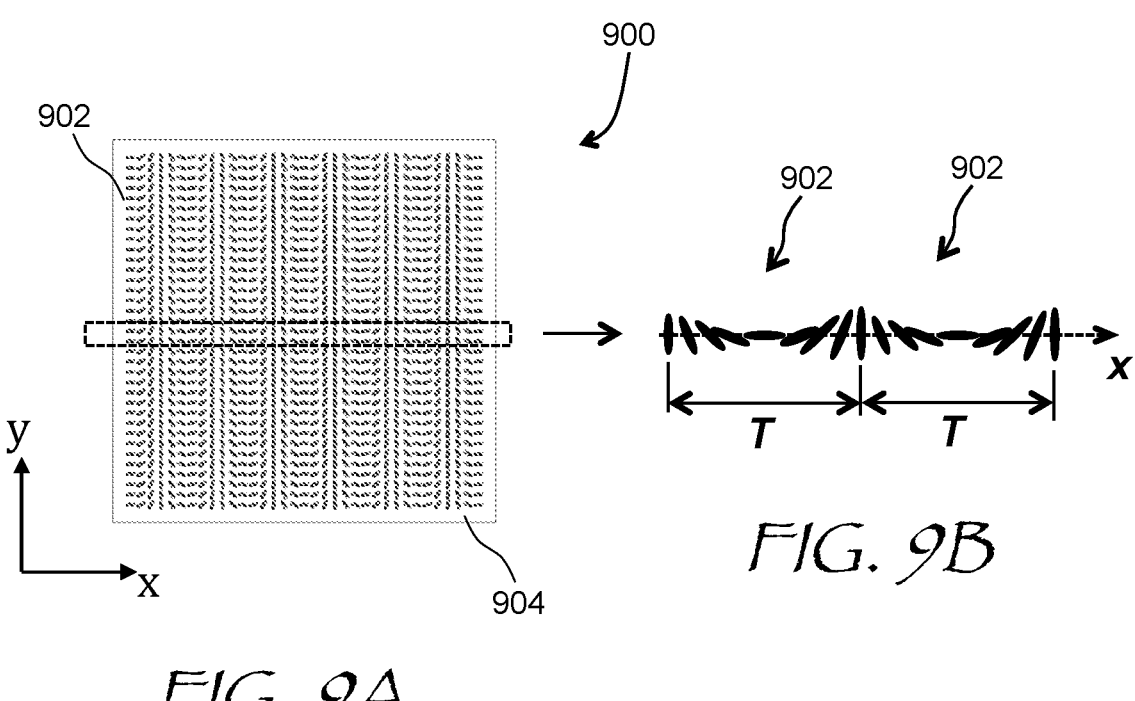
*FIG. 9A*
*FIG. 9B*
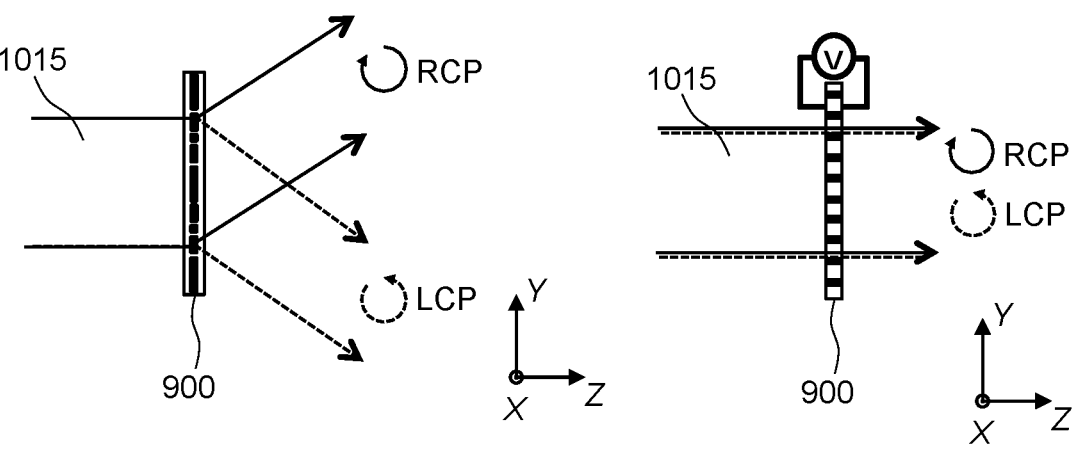
*FIG. 10A*
*FIG. 10B*

DIRECTIONAL ILLUMINATOR AND DISPLAY APPARATUS WITH SWITCHABLE DIFFUSER

REFERENCE TO RELATED APPLICATION

This application claims priority from U.S. Provisional Patent Application No. 63/286,381 entitled "Display Applications of Switchable Gratings", and U.S. Provisional Patent Application No. 63/286,230 entitled "Active Fluidic Optical Element", both filed on Dec. 6, 2021 and incorporated herein by reference in their entireties.

TECHNICAL FIELD

The present disclosure relates to tunable optical devices, and in particular to lightguides usable in visual display systems, as well as and components, modules, and methods for lightguides and visual display systems.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner component including its light routing optics may be transparent to external light.

An NED is usually worn on the head of a user. Consequently, a large, bulky, unbalanced, and heavy display device with a heavy battery would be cumbersome and uncomfortable for the user to wear. Head-mounted display devices can benefit from a compact and efficient configuration, including efficient light sources and illuminators providing illumination of a display panel, high-throughput combiner components and ocular lenses, and other optical elements in the image forming train that can provide an image to a user's eye with minimal image distortions and artifacts.

BRIEF DESCRIPTION OF THE DRAWINGS

Exemplary embodiments will now be described in conjunction with the drawings, in which:

FIG. 4 is a flow chart of a method for displaying an image using any of the display apparatuses of FIGS. 1-3;

FIG. 9A is a frontal view of an active Pancharatnam-Berry phase (PBP) liquid crystal (LC) grating usable in a switchable diffuser of this disclosure;

FIG. 9B is a magnified schematic view of LC molecules in an LC layer of the active PBP LC grating of FIG. 9A;

FIGS. 10A and 10B are side schematic views of the active PBP LC grating of FIGS. 9A and 9B, showing light propagation in OFF (FIG. 10A) and ON (FIG. 10B) states of the active PBP LC grating;

DETAILED DESCRIPTION

Figure 1:
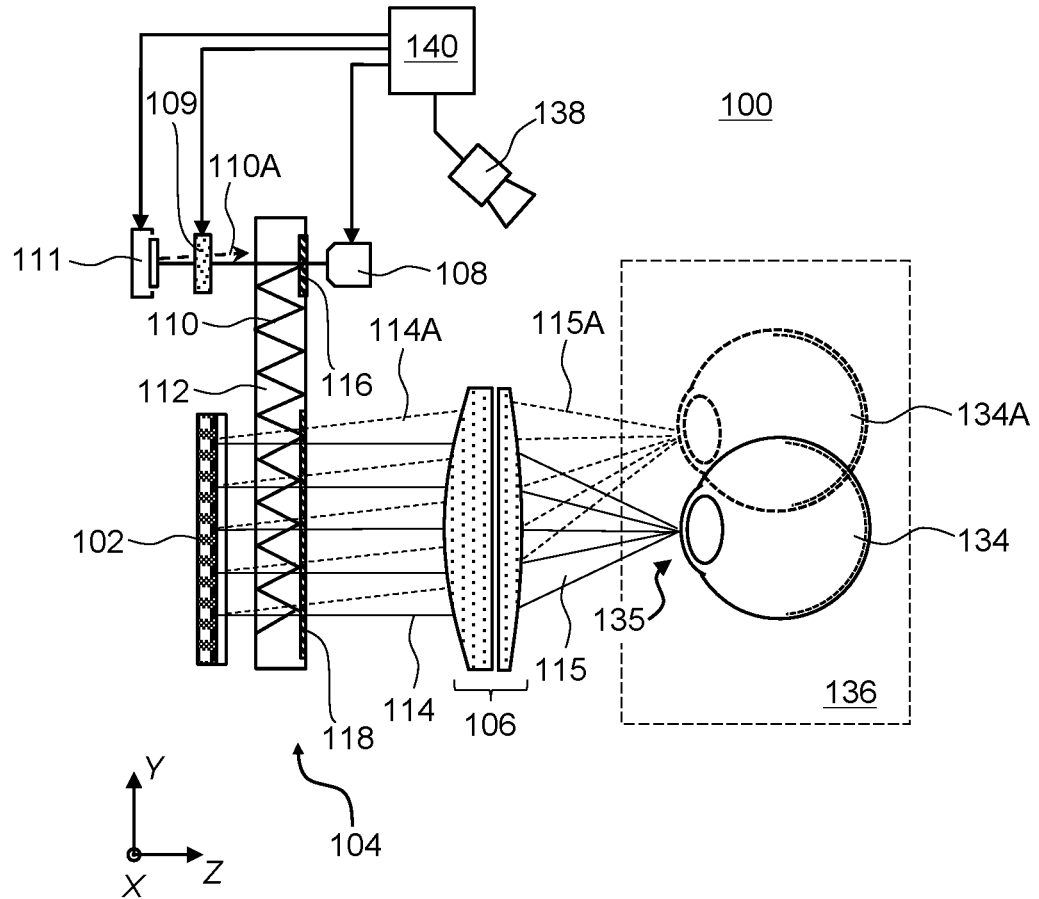
FIG. 1 is a schematic side view of a display apparatus of this disclosure including a reflective display panel illuminated through a lightguide coupled to a switchable diffuser and a tiltable reflector, illustrating the usage of the tiltable reflector to very exit pupil position.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Near-eye displays use lightguides to carry images to user's eyes, as well as to illuminate miniature display panels viewed from a close distance via a pair of ocular lenses. A directional illuminator based on a lightguide may use a laser light source to illuminate a transmissive or reflective display panel. Laser light illumination, while convenient and power-efficient, often results in appearance of speckles in the generated image, due to a coherent nature of laser light. Furthermore, a high degree of collimation of a laser beam may cause undesirable reduction of the exit pupil of the display apparatus.

In accordance with this disclosure, a lightguide-based directional illuminator for a display panel may include a switchable diffuser for expanding and modulating the light beam by a controlled, tunable amount. The terms "switchable", "tunable", and "variable" are used interchangeably herein, and mean that a parameter of a diffuser such as magnitude of spatial or temporal amplitude or phase modulation may be tuned to a desired value or set of values by applying an external control signal. The particular parameters being controlled depend on the type and overall configuration of the switchable diffuser being used.

The tunability of the switchable diffuser parameters enables the optimization of such illumination parameters as the size and location of the exit pupil, i.e. the size and location of the image light beam at the eyebox, the degree of coherence of the image light beam, etc., improving overall light utilization efficiency and facilitating the reduction of pupil-related artifacts and speckle patterns.

In accordance with the present disclosure, there is provided a display apparatus comprising a display panel for displaying an image, a light source for providing an illuminating light beam, a switchable diffuser coupled to the light source for imparting at least one of a spatially variant amplitude or spatially variant phase delay to the illuminating light beam, a lightguide coupled to the switchable diffuser for conveying the illuminating light beam propagated through the switchable diffuser to the display panel, whereby the display panel provides an image light beam carrying the image, and an objective for receiving and conveying the image light beam to an eyebox of the display apparatus for viewing the image at the eyebox. The display apparatus may further include an eye tracker for determining a size of a pupil of an eye at the eyebox, and a controller operably coupled to the eye tracker and the switchable diffuser and configured to cause the switchable diffuser to increase a divergence of the illuminating light beam for the image light beam to correspond to the pupil size determined by the eye tracker. The lightguide may be a pupil-replicating lightguide for expanding the illuminating light beam across the display panel.

In embodiments where at least one of a spatially variant amplitude or spatially variant phase delay is time-varying, the display apparatus may further include a controller operably coupled to the switchable diffuser and configured to cause the switchable diffuser to increase a time-averaged divergence of the illuminating light beam. The switchable diffuser may include a grating switched at a frequency of at least 5 kHz. The switchable diffuser may increase a time-averaged divergence of the illuminating light beam by at least one degree. The controller may be configured to cause the switchable diffuser to at least one of redirect the illuminating light beam in an oscillating manner to increase the time-averaged divergence of the illuminating light beam for the image light beam to correspond to the pupil size, and/or to redirect the illuminating light beam for the image light beam to shift toward the pupil position determined by the eye tracker.

In some embodiments, a tiltable reflector may be provided for redirecting the illuminating light beam before the illuminating light beam impinges onto the lightguide. A controller may be operably coupled to the eye tracker and the tiltable reflector and configured to cause the tiltable reflector to redirect the illuminating light beam for the image light beam to follow the position of the pupil determined by the eye tracker. In embodiments where the display panel comprises a reflective display panel, the lightguide may be disposed between the display panel and the objective, such that in operation, the image light propagates through the lightguide and the objective towards the eyebox.

The switchable diffuser may include e.g. a switchable polarization volume hologram; a switchable Pancharatnam-Berry phase (PBP) liquid crystal (LC) grating; a fluidic grating; and/or a switchable liquid crystal (LC) grating comprising a polymer-based surface-relief grating structure where the polymer-based surface-relief grating structure may optionally include a birefringent polymer. In embodiments where the display apparatus includes a surface-wave acoustic actuator coupled to the lightguide, the switchable diffuser may include a surface acoustic wave formed by the surface-wave acoustic actuator in the lightguide. In embodiments where the display apparatus includes a volume-wave acoustic actuator coupled to the lightguide, the switchable diffuser may include a volume acoustic wave formed by the volume-wave acoustic actuator in the lightguide. The switchable diffuser may include a grating having an optical retardation modulated at a peak-to-peak amplitude of at least 150 nm.

In accordance with the present disclosure, there is provided a method for displaying an image, the method comprising providing an illuminating light beam; using a switchable diffuser to impart at least one of spatially variant amplitude or spatially variant phase delay to the illuminating light beam; conveying the illuminating light beam propagated through the switchable diffuser to a display panel, whereby the display panel provides an image light beam carrying the image; and conveying the image light beam to an eyebox.

In embodiments where the at least one of spatially variant amplitude or spatially variant phase delay is time-varying across the illuminating light beam, the method may further include using an eye tracker to determine at least one of a position or a size of a pupil of an eye at the eyebox; and causing the switchable diffuser to increase a time-averaged divergence of the illuminating light beam for the image light beam to correspond to the pupil size. The method may further include redirecting the illuminating light beam for the image light beam to follow the position of the pupil determined by the eye tracker. The redirecting may be performed by at least one of the switchable diffuser or a tiltable reflector in an optical path of the illuminating light beam.

In accordance with the present disclosure, there is further provided a directional illuminator with a controllable divergence of an output light beam. The directional illuminator includes a light source for providing an illuminating light beam, a switchable diffuser coupled to the light source for imparting at least one of spatially variant amplitude or spatially variant phase delay to the illuminating light beam to control a divergence of the illuminating light beam, and a pupil-replicating lightguide coupled to the switchable diffuser for expanding the illuminating light beam propagated through the switchable diffuser, thereby producing the output light beam with the controllable divergence. The at least one of a spatially variant amplitude or spatially variant phase delay may be time-varying across the illuminating light beam for increasing a time-averaged value of the divergence of the illuminating light beam.

Referring now to FIG. 1, a display apparatus 100 includes a reflective display panel 102, a directional illuminator 104, and an objective 106, which may perform a function of an ocular element, a projection element, and/or a collimator. The directional illuminator 104 includes a light source 108 providing an illuminating light beam 110, a switchable diffuser 109 coupled to the light source 108 to provide a controllable increase of divergence of the illuminating light beam 110, and a lightguide 112 coupled to the switchable diffuser 109 for expanding the illuminating light beam 110 across the surface of the reflective display panel 102, i.e. in XY plane. The reflective display panel 102 reflects the illuminating light beam 110 with spatially variant reflectivity, forming an image light beam 114 propagating through the lightguide 112 towards the objective 106, i.e. in the direction of Z-axis in FIG. 1. The objective 106 focuses the image light beam 114, producing a converging image light beam 115 carrying an image in angular domain to an eyebox 136 for direct observation by a user's eye 134 at the eyebox 136. Herein, the term "image in angular domain" means an image where which different elements of the image (i.e. pixels of the image) are represented by angles of corresponding rays of the converging image light beam 115, the rays carrying optical power levels and/or color composition corresponding to brightness and/or color values of the image pixels. The objective 106 may be e.g. a lens, a pancake lens, a reflective element, a refractive element, a reflective/refractive element combination, etc.

The illuminating light beam 110 may be coupled into the lightguide 112 by an in-coupling grating 116, which may receive the illuminating light beam 110 directly from the light source 108. The in-coupling grating 116 may also receive the illuminating light beam 110 via a tiltable reflector 111 shown in FIG. 1, e.g. a microelectromechanical system (MEMS) tiltable reflector. The tiltable reflector 111 is disposed in an optical path between the light source 108 and the lightguide 112. The display apparatus 100 may further include an eye tracker 138 that determines at least one of position or orientation of the user's eye 134 in the eyebox 136. Such information may be used e.g. to determine a position of a pupil 135 of the user's eye 134. A size of the pupil 135 may also be determined by the eye tracker 138. A controller 140 may be operably coupled to the eye tracker 138 and the tiltable reflector 111. The controller 140 may be configured to direct the converging image light beam 115 to the position of the user's eye pupil 135, as the user's eye 134 moves around or changes its orientation.

In operation, the tiltable reflector 111 receives the illuminating light beam 110 from the light source 108 through the in-coupling grating 116. The in-coupling grating 116 may be polarization-selective, transmitting light of a first polarization state, e.g. a circular polarization of a first handedness, while diffracting light of a second, orthogonal polarization state, e.g. a circular polarization of a second, opposite handedness. When the illuminating light beam 110 emitted by the light source 108 is in the first polarization state, the illuminating light beam 110 propagates through the in-coupling grating 116 substantially without diffraction, and impinges onto the tiltable reflector 111. The tiltable reflector 111 redirects the illuminating light beam 110 towards the lightguide 112 at a variable incidence angle. Upon reflection from the tiltable reflector 111, the polarization state of the illuminating light beam 110 changes from the first polarization state to the second polarization state, causing the in-coupling grating 116 to in-couple the illuminating light beam 110 into the lightguide 112 at an angle corresponding to the tilt angle of the tiltable reflector 111. An out-coupling grating 118, which may also be a polarization-selective grating, out-couples parallel portions of the illuminating light beam 110 to illuminate the entire area of the reflective display panel 102. In other words, the lightguide 112 operates as a pupil-replicating lightguide providing multiple offset parallel portions of the illuminating light beam 110 for illumination of the entire reflective display panel 102. The illuminating light beam 110 portions reflected by the display panel 102 form the image light beam 114 polarized orthogonally to the illuminating light 110, causing the image light beam 114 to propagate through the out-coupling grating 118 towards the objective 106. The objective 106 produces the converging image light beam 115 at the eyebox 136.

The varying angle of the illuminating light beam 110 causes an angle of incidence of the image light beam 114 onto the objective 106 to be varied. The angle of incidence variation translates into a variation of the location of the focused image light beam at the focal plane of the objective 106, i.e. the eyebox 136. The controller 140 may tilt the tiltable reflector 111 to make the location of the focused image light beam follow the location of the user's eye 134 pupil 135 in the eyebox 136. For example, when the tiltable reflector 111 is tilted away from its nominal angle, the image light beam 114 shifts as shown with dashed lines 114A to follow a new location 134A of the user's eye 134. It is noted that the tiltable reflector 111 may be tiltable about two axes, i.e. about X- and Y-axes, enabling the converging image light beam 115 to be directed anywhere on XY plane within the eyebox 136.

Figure 2:
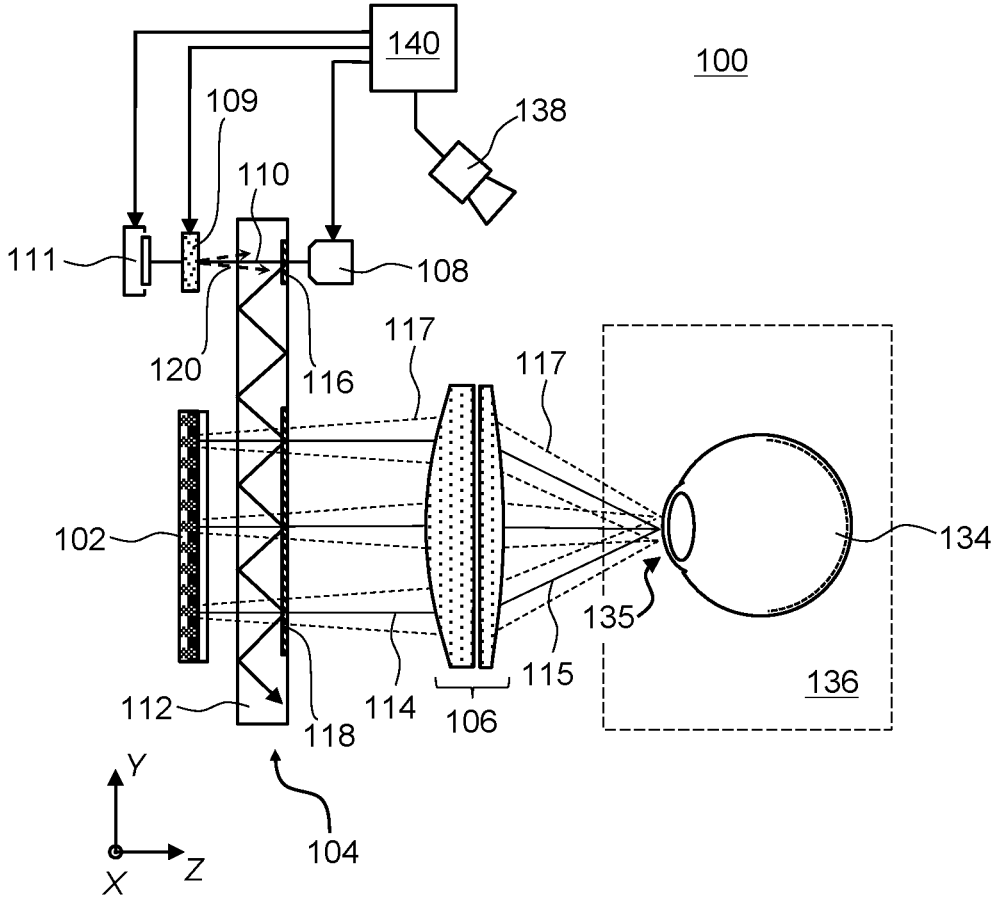
FIG. 2 is a schematic side view of the display apparatus of FIG. 1 illustrating the usage of the switchable diffuser to vary exit pupil size.

The function of the switchable diffuser 109 in the display apparatus 100 will now be explained. Referring to FIG. 2, the switchable diffuser 109 imparts at least one of a spatially variant amplitude or spatially variant phase delay to the illuminating light beam 110, increasing a divergence of the illuminating light beam 110. The diverging illuminating light beam 110 is schematically illustrated with dashed lines 120. The at least one of a spatially variant amplitude or spatially variant phase delay may be time-varying across the illuminating light beam 110, causing the illuminating light beam 110 to diverge and/or deviate. The deviation may be smooth and slow, may be stepped between several steady values, and/or may be quickly oscillated in time to increase a time-averaged value of divergence, i.e. averaged over several periods of oscillations of an instantaneous direction and instantaneous divergence of the illuminating light beam 110. The instantaneous divergence and/or the beam direction may be continuously tuned or switched between several preset discrete values, depending on a configuration of the switchable diffuser 109. Thus, the divergence of the illuminating light beam 110, which is an output light beam of the directional illuminator 104, may be precisely controlled. The output light beam divergence may be tunable or switchable between several values e.g. by at least 1 degree, at least 2 degrees, or at least 6 degrees in some embodiments.

The increased divergence of the illuminating light beam 110 will cause the image light beam 114 to also be more divergent, as indicated with dashed lines 117. Consequently, the converging image light beam 115 will no longer be focused into a tight spot, being instead spread over a larger area. The magnitude of the area, or the exit pupil size of the display apparatus 100, depends on the magnitude of divergence of the illuminating light beam 110. The magnitude of divergence is defined by the switchable diffuser 109, enabling the controller 140 to cause the switchable diffuser 109 to tune the divergence to a desired value, e.g. to increase the divergence to a larger value or to decrease the divergence back to a smaller value. The controller 140 may be configured to operate the switchable diffuser 109 to make the output spot size of the image light beam 115 correspond to a size of the pupil 135 of the user's eye 134 determined by the eye tracker 138, e.g. to match the eye pupil size or to overfill the pupil 135 by a controllable amount. Operating the switchable diffuser may also reduce the formation of speckle patterns in the images conveyed by the image light 115, at least in part due to spatial averaging of the speckle patterns afforded by continuous operation of the switchable diffuser 109. Furthermore in some embodiments, the controller 140 may be configured to redirect the illuminating light beam 110 for the converging image light beam 115 to shift toward the pupil position 135 determined by the eye tracker 138.

Filling the entire pupil 135 with image light may provide several advantages. A too thin image light beam 115, much smaller than the eye pupil size, may emphasize eye viewing defects, such as so-called eye floaters, and may cause an abrupt image disappearance when the location of the image light beam 115 no longer coincides with the eye pupil location. Overfilling the pupil, although causing some light loss, may be more beneficial for improving overall brightness stability and observability of the displayed image as the eye 134 shifts or rotates in the eyebox 136. The switchable diffuser 109 may increase a time-averaged divergence of the illuminating light beam by at least one degree, or at least two degrees, four degrees, or even eight degrees in some embodiments.

Applications of the switchable scatterer 109 are not limited to reflective display panel configurations. Referring for a non-limiting example to FIG. 3, a display apparatus 300 includes a transmissive display panel 302, a directional illuminator 304, and an objective 306, also termed ocular element, a projection element, or a collimator. The directional illuminator 304 includes the light source 108 providing the illuminating light beam 110, the switchable diffuser 109 coupled to the light source 108 for a controllable increase of divergence of the illuminating light beam 110, and a lightguide 312 coupled to the switchable diffuser 109 for expanding the illuminating light beam 110 across the surface of the transmissive display panel 302, i.e. in XY plane. The transmissive display panel 302 transmits the illuminating light beam 110 with spatially variant transmissivity, forming an image light beam 314 propagating towards the objective 306, i.e. in the direction of Z-axis in FIG. 3. The objective 306 focuses the image light beam 314, producing a converging image light beam 315 carrying an image in angular domain to the eyebox 136 for direct observation by the user's eye 134 at the eyebox 136. The objective 306 may be e.g. a lens, a pancake lens, a reflective element, a refractive element, a reflective/refractive element combination, etc.

The illuminating light beam 110 may be coupled into the lightguide 112 directly from the light source 108, or via the tiltable reflector 111 disposed in an optical path between the light source 108 and the lightguide 112. Similarly to the display apparatus 100 of FIGS. 1 and 2, the display apparatus 300 of FIG. 3 may include an eye tracker 138 that determines at least one of position or orientation of the user's eye 134 in the eyebox 136. A controller 340 may be operably coupled to the eye tracker 138 and the tiltable reflector 111 for directing the converging image light beam 315 to the position of the user's eye pupil 135. As the user's eye 134 moves or changes its orientation e.g. to the location 134A, the controller 340 detects this via the eye tracker 138, tilts the tiltable reflector 111, and causes the converging image light beam 315 to deviate to a location 315A to match the location 134A. To summarize, the controller 340 may operate the switchable diffuser 109 and the tiltable reflector 111 based on the eye position/orientation/pupil size information obtained from the eye tracker 138 in a similar manner as the display apparatus 100 of FIGS. 1 and 2.

Turning to FIG. 4 with further reference to FIGS. 1 and 2, a method 400 for displaying an image includes providing (402) an illuminating light beam, e.g. the illuminating light beam 110 provided by the light source 108 of the display apparatus 100 of FIGS. 1 and 2. A switchable diffuser, e.g. the switchable diffuser 109 of the display apparatus 100, is used (FIG. 4; 404) to impart at least one of spatially variant amplitude or spatially variant phase delay to the illuminating light beam. The illuminating light beam propagated through the switchable diffuser is conveyed (406) to a display panel, e.g. the reflective display panel 102. Upon illumination with the light beam, the display panel provides an image light beam carrying the image. The image light beam is then conveyed (408) to the eyebox.

In embodiments where the at least one of spatially variant amplitude or spatially variant phase delay is time-varying across the illuminating light beam, the method may further include using an eye tracker to determine (410) at least one of a position or a size of a pupil of an eye at the eyebox, and causing the switchable diffuser to increase (412) a time-averaged divergence of the illuminating light beam for the image light beam to correspond to the pupil size, as explained above with reference to FIG. 2. In some embodiments, the illuminating light beam may be redirected (414) for the image light beam to follow the position of the pupil determined by the eye tracker. The redirecting operation may be performed by at least one of the switchable diffuser or a tiltable reflector, e.g. the tiltable reflector 111, in the optical path of the illuminating light beam.

Figure 3:
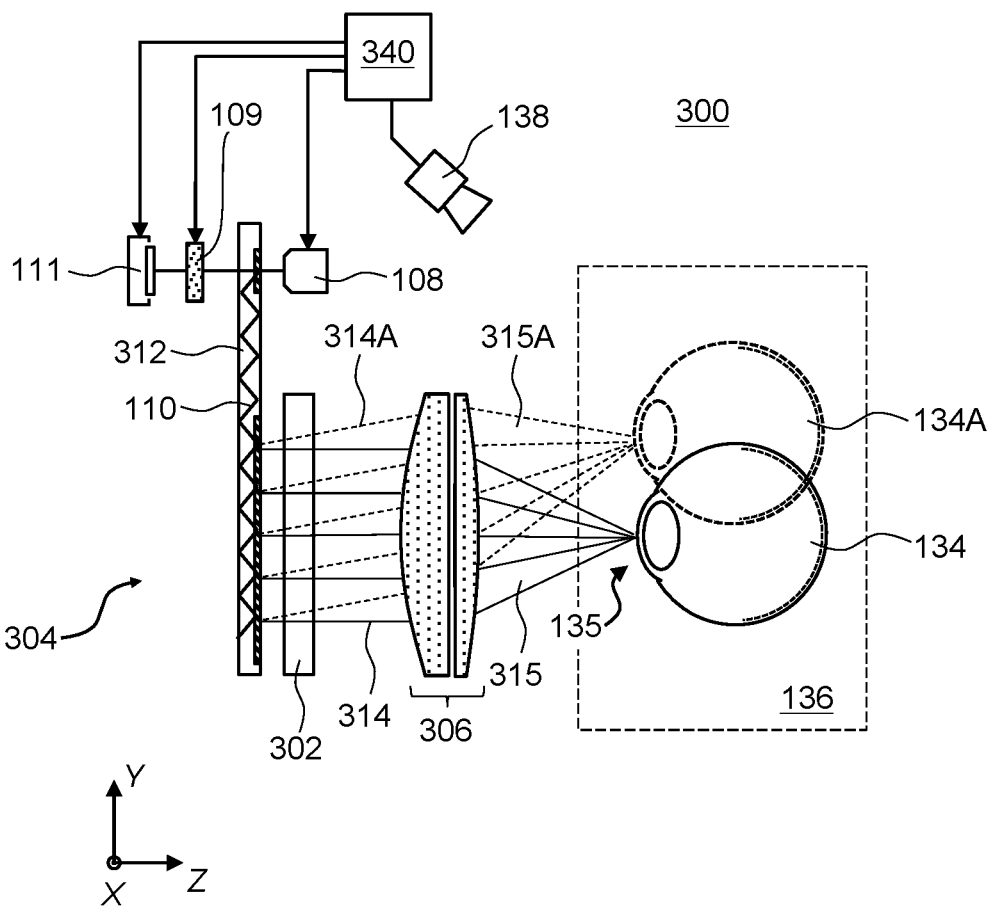
FIG. 3 is a schematic side view of a display apparatus embodiment including a transmissive display panel illuminated through a lightguide coupled to a switchable diffuser and a tiltable reflector.
Figure 5:
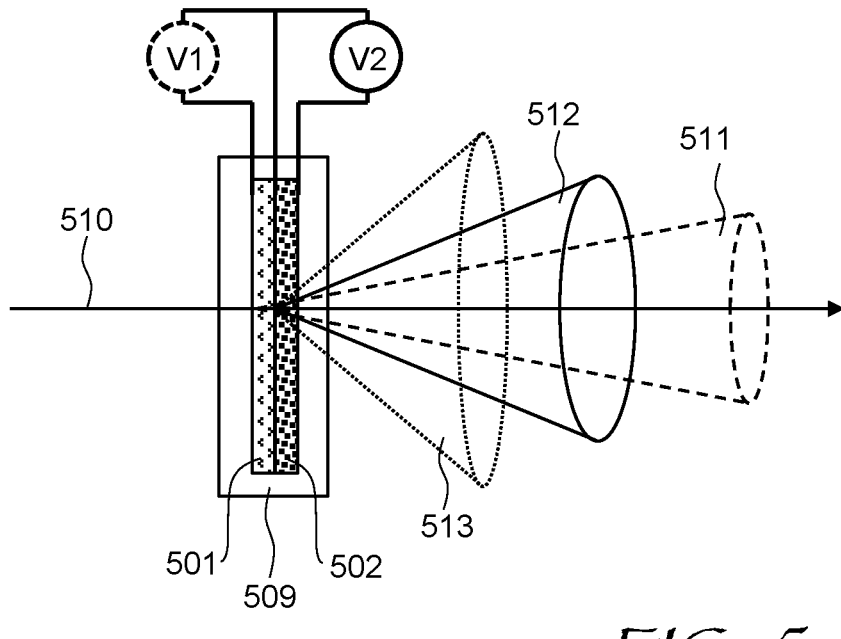
FIG. 5 is a schematic diagram of a switchable scatterer embodiment of the switchable diffuser of FIGS. 1-3.

Referring now to FIG. 5, a switchable scatterer 509 may be used in the switchable diffuser 109 of the display apparatus 100 of FIGS. 1 and 2, on in the display apparatus 300 of FIG. 3. The switchable scatterer 509 of FIG. 5 includes first 501 and second 502 switchable scatterer sections. Each switchable scatterer section 501, 502 includes scattering particles or domains suspended in respective substrates. The scattering particles have a first effective refractive index, and the substrates have a second effective refractive index. The refractive index contrast, i.e. the difference between the first and second effective refractive indices, may be tunable by applying a respective control signal to the first 501 and second 502 switchable scatterer sections. By way of a non-limiting example, when a first voltage V1 is applied to the first switchable scatterer section 501 and a second voltage V2 is applied to the second switchable scatterer section 502, the refractive index contrast is approximately zero for both the first 501 and second 502 switchable scatterer sections. When a first voltage V1 is removed from the first switchable scatterer section 501, the refractive index contrast of the first switchable scatterer section 501 becomes non-zero, causing an impinging light beam 510 to scatter in a first cone 511 shown with dashed lines. When a second voltage V2 is removed from the second switchable scatterer section 502, the refractive index contrast of the second switchable scatterer section 502 becomes non-zero, causing the impinging light beam 510 to scatter in a second cone 512 shown with solid lines. The particles of the second switchable scatterer section 502 may be smaller and/or more densely spaced than the particles of the first switchable scatterer section 501, making the second cone 512 wider than the first cone 511. Finally, when both the first V1 and second V2 voltages are removed from the respective first 501 and second 502 switchable scatterer sections, the impinging light beam 510 will scatter into a third cone 513 shown with dotted lines. The third cone 513 is a sum of the first 511 and second 512 cones, and consequently is wider than both the first 511 and second 512 cones.

Figure 6:
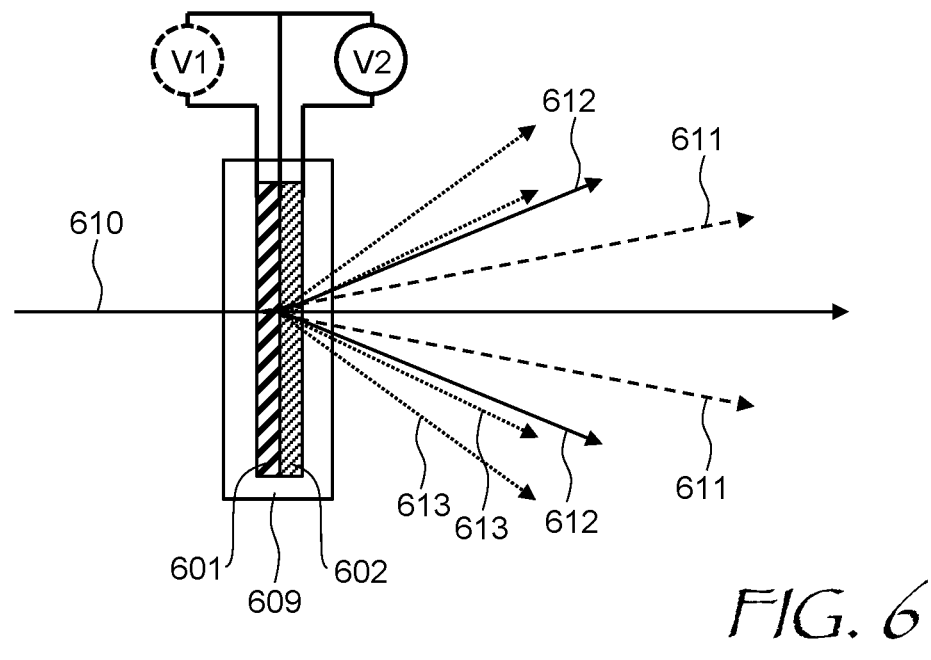
FIG. 6 is a schematic diagram of a switchable redirector embodiment of the switchable diffuser of FIGS. 1-3.

Turning to FIG. 6, a switchable redirector 609 may be used in the switchable diffuser 109 of the display apparatus 100 of FIGS. 1 and 2, or in the display apparatus 300 of FIG. 3. The switchable redirector 609 of FIG. 6 includes first 601 and second 602 switchable redirector sections. Each switchable redirector section 601, 602 includes an array of transparent grating fringes suspended in respective substrates. The fringes have a first effective refractive index, and the substrates have a second effective refractive index. The refractive index contrast, i.e. the difference between the first and second effective refractive indices, may be tunable by applying a respective control signal to the first 601 and second 602 switchable redirector sections. For example, nominally when a first voltage V1 is applied to the first switchable redirector section 601 and a second voltage V2 is applied to the second switchable redirector section 602, the refractive index contrast is approximately zero for both the first 601 and second 602 switchable redirector sections. When a first voltage V1 is removed from the first switchable redirector section 601, the refractive index contrast of the first switchable redirector section 601 becomes non-zero, causing an impinging light beam 610 to diffract into first beams 611 shown with dashed lines. When a second voltage V2 is removed from the second switchable redirector section 602, the refractive index contrast of the second switchable redirector section 602 is non-zero, causing the impinging light beam 610 to diffract second beams 612 shown with solid lines. The fringes of the second switchable redirector section 602 may be more densely spaced than the fringes of the first switchable redirector section 601, making the second beams 612 more widely spaced than the first beams 611. Finally, when both the first V1 and second V2 voltages are removed from the respective first 601 and second 602 switchable redirector sections, the impinging light beam 610 will diffract into a plurality of third beams 613 shown with dotted lines. The third beams 613 will propagate in a plurality of directions. Generally, the cone of directions of propagation will be wider than the cone of the first 611 and second 612 beams.

In operation, the voltages V1 and V2 may be quickly switched ON and OFF to redirect the illuminating light beam 110 of the display apparatus 100 of FIGS. 1 and 2, or the display apparatus 300 of FIG. 3 in an oscillating manner to increase a time-averaged divergence of the light beam 610. Responsive to the increased time-averaged divergence of the illuminating light beam 110, the image light beam 115 (FIG. 2) is focused into a wider time-averaged spot at the eyebox 136 to match the size of the eye pupil 135. Alternatively or in addition, the controller may switch the voltages V1 and/or V2 to deviate the illuminating light beam 110 to facilitate matching the position of the eye pupil 135 determined by the eye tracker138, i.e. to assist the tiltable reflector 111, or to operate completely independently or instead of the tiltable reflector 111. It is noted that, depending on the configuration of switchable diffraction gratings used, only one diffractive beam switchable between a plurality of angles may be formed, or at least more light energy may be sent into one diffractive order than the other. The switchable gratings of the first 601 and second 602 redirector sections may be switched at a high enough frequency, e.g. 5 kHz or higher. The switchable gratings of the first 601 and second 602 redirector sections may have an optical retardation modulated at a peak-to-peak amplitude of at least 150 nm, for example.

Figure 7:
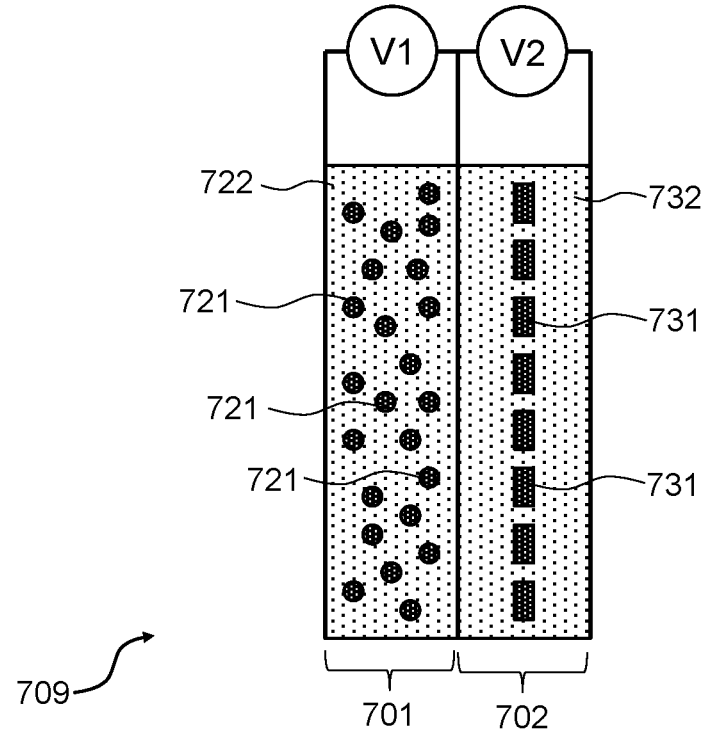
FIG. 7 is a schematic diagram of a switchable diffuser embodiment illustrating the operation of switchable beam scattering and redirection in a structure with a controlled refractive index contrast.

Switchable scatterers and switchable redirectors may be combined in a single switchable diffuser component. Referring for a non-limiting illustrative example to FIG. 7, a switchable diffuser 709 may be used as the switchable diffuser 109 in the display apparatuses 100 and 300 of FIGS. 1-3. The switchable diffuser 709 includes first 701 and second 702 sections. The first section 701 includes scatterers 721 of a first refractive index suspended in a substrate 722 of a second refractive index. A refractive index contrast of the first section 701, i.e. the difference between the first and second refractive indices, is voltage-dependent; an external voltage V1 applied to the substrate 722 changes the refractive index contrast and, accordingly, changes the degree of light scattering by the first section 701. Similarly, the second section 702 includes an array of diffraction grating fringes 731 of a third refractive index suspended in a substrate 732 of a fourth refractive index. A refractive index contrast of the second section 702, i.e. the difference between the third and fourth refractive indices, is voltage-dependent; an external voltage V2 applied to the substrate 732 changes the refractive index contrast and, accordingly, changes the degree of light redirection, by diffraction, by the second section 702.

Non-limiting examples of switchable diffusers and redirectors usable in lightguides and displays of this disclosure will now be presented.

Figure 8:
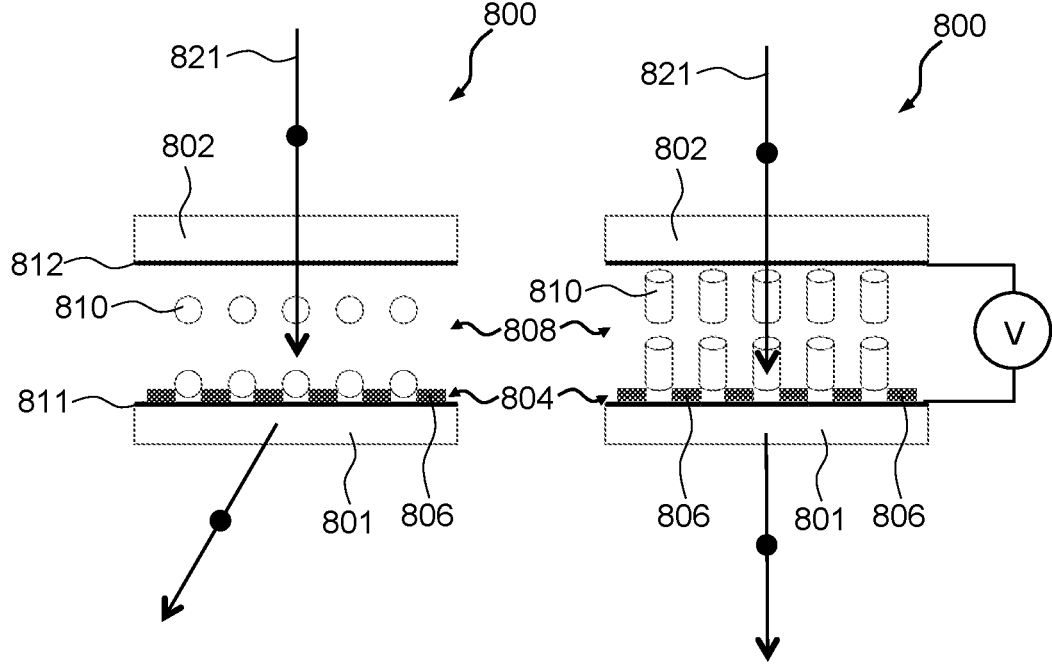
FIG. 8 shows side cross-sectional views of a tunable liquid crystal (LC) surface-relief grating usable in a switchable diffuser of this disclosure.

Referring first to FIG. 8, a tunable liquid crystal (LC) surface-relief grating 800 may be used e.g. in the switchable diffuser of the display apparatus 100 of FIGS. 1 and 2 and the display apparatus 300 of FIG. 3. The tunable LC surface-relief grating 800 includes a first substrate 801 supporting a first conductive layer 811 and a surface-relief grating structure 804 having a plurality of ridges 806 extending from the first substrate 801 and/or the first conductive layer 811.

A second substrate 802 is spaced apart from the first substrate 801. The second substrate 802 supports a second conductive layer 812. A cell is formed by the first 811 and second 812 conductive layers. The cell is filled with a LC fluid, forming an LC layer 808. The LC layer 808 includes nematic LC molecules 810, which may be oriented by an electric field across the LC layer 808. The electric field may be provided by applying a voltage V to the first 811 and second 812 conductive layers.

The surface-relief grating structure 804 may be polymer-based, e.g. it may be formed from a polymer having an isotropic refractive index $n_p$ of about 1.5, for example. The LC fluid has an anisotropic refractive index. For light polarization parallel to a director of the LC fluid, i.e. to the direction of orientation of the nematic LC molecules 810, the LC fluid has an extraordinary refractive index $n_e$, which may be higher than an ordinary refractive index $n_o$ of the LC fluid for light polarization perpendicular to the director. For example, the extraordinary refractive index $n_e$ may be about 1.7, and the ordinary refractive index $n_o$ may be about 1.5, i.e. matched to the refractive index $n_p$ of the surface-relief grating structure 804.

When the voltage V is not applied (left side of FIG. 8), the LC molecules 810 are aligned approximately parallel to the grooves of the surface-relief grating structure 804. At this configuration, a linearly polarized light beam 821 with e-vector oriented along the grooves of the surface-relief grating structure 804 will undergo diffraction, since the surface-relief grating structure 804 will have a non-zero refractive index contrast. When the voltage V is applied (right side of FIG. 8), the LC molecules 810 are aligned approximately perpendicular to the grooves of the surface-relief grating structure 804. At this configuration, a linearly polarized light beam 821 with e-vector oriented along the grooves of the surface-relief grating structure 804 will not undergo diffraction because the surface-relief grating structure 804 will appear to be index-matched and, accordingly, will have a substantially zero refractive index contrast. For the linearly polarized light beam 821 with e-vector oriented perpendicular to the grooves of the surface-relief grating structure 804, no diffraction will occur in either case (i.e. when the voltage is applied and when it is not) because at this polarization of the linearly polarized light beam 821, the surface-relief grating structure 804 are index-matched. Thus, the tunable LC surface-relief grating 800 can be switched on and off (for polarized light) by controlling the voltage across the LC layer 808. Several such gratings with differing pitch/slant angle/refractive index contrast may be used to switch between several grating configurations.

In some embodiments of the LC surface-relief grating 800, the surface-relief grating structure 804 may be formed from an anisotropic polymer with substantially the same or similar ordinary $n_o$ and extraordinary $n_e$ refractive indices as the LC fluid. When the LC director aligns with the optic axis of the birefringent polymer, the refractive index contrast is close to zero at any polarization of impinging light, and there is no diffraction. When the LC director is misaligned with the optic axis of the birefringent polymer e.g. due to application of an external electric field, the refractive index contrast is non-zero for any or most polarizations of the impinging light, and accordingly there is diffraction and beam deflection.

Referring now to FIG. 9A, a Pancharatnam-Berry phase (PBP) LC switchable grating 900 may be used e.g. in the switchable diffuser of the display apparatus 100 of FIGS. 1 and 2 and the display apparatus 300 of FIG. 3. The PBP LC switchable grating 900 of FIG. 9A includes LC molecules 902 in an LC layer 904. The LC molecules 902 are disposed in XY plane at a varying in-plane orientation depending on the X coordinate. The orientation angle $\phi(x)$ of the LC molecules 902 in the PBP LC switchable grating 900 is given by $$\phi(x)=\pi x/T=\pi x \sin\theta/\lambda_o \qquad (1)$$

where $\lambda_o$ is the wavelength of impinging light, T is a pitch of the PBP LC switchable grating 900, and $\theta$ is a diffraction angle given by $$\theta=\sin^{-1}(\lambda_o/T) \qquad (2)$$

The azimuthal angle $\phi$ varies continuously across the surface of an LC layer 904 parallel to XY plane as illustrated in FIG. 9B. The variation has a constant period equal to T. The optical phase delay P in the PBP LC grating 900 of FIG. 9A is due to the PBP effect, which manifests $P(x)=2\phi(x)$ when the optical retardation R of the LC layer 904 is equal to $\lambda_o/2$.

FIGS. 10A and 10B illustrate the operation of the PBP LC switchable grating 900 of FIG. 9A. The PBP LC switchable grating 900 includes the LC layer 904 (FIG. 9A) disposed between parallel substrates configured for applying an electric field across the LC layer 904. The LC molecules 902 are oriented substantially parallel to the substrates in absence of the electric field, and substantially perpendicular to the substrates in presence of the electric field.

In FIG. 10A, the PBP LC switchable grating 900 is in OFF state, such that its LC molecules 902 (FIGS. 9A, 9B) are disposed predominantly parallel to the substrate plane, that is, parallel to XY plane in FIG. 10A. When an incoming light beam 1015 is left-circular polarized (LCP), the PBP LC switchable grating 900 redirects the light beam 1015 upwards by a pre-determined non-zero angle, and the beam 1015 becomes right-circular polarized (RCP). The RCP deflected beam 1015 is shown with solid lines. When the incoming light beam 1015 is right-circular polarized (RCP), the PBP LC switchable grating 900 redirects the beam 1015 downwards by a pre-determined non-zero angle, and the beam 1015 becomes left-circular polarized (LCP). The LCP deflected beam 1015 is shown with dashed lines. Applying a voltage V to the PBP LC switchable grating 900 reorients the LC molecules along Z-axis, i.e. perpendicular to the substrate plane as shown in FIG. 10B. At this orientation of the LC molecules 902, the PBP structure is erased, and the light beam 1015 retains its original direction, whether it is LCP or RCP. Thus, the active PBP LC grating 900 is a tunable grating, i.e. it has a variable beam steering property. Furthermore, the operation of the active PBP LC grating 900 may be controlled by controlling the polarization state of the impinging light beam 1015.

Figure 11A:
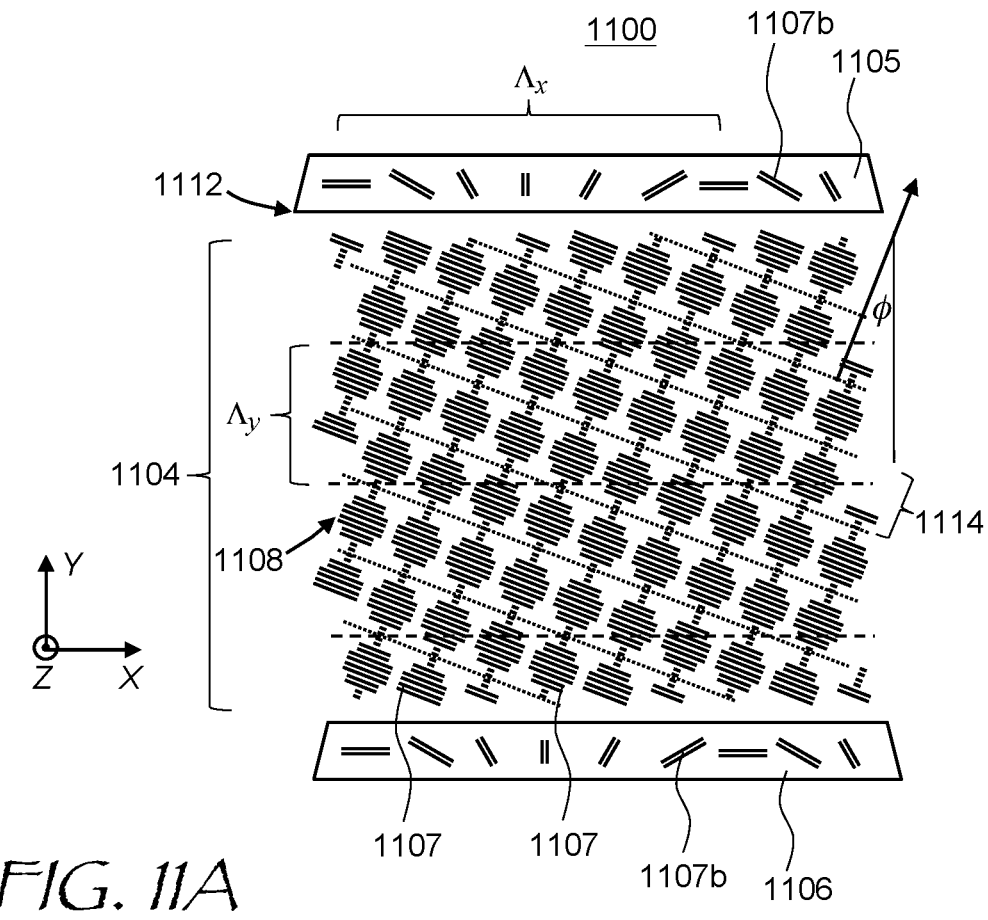
FIG. 11A is a side cross-sectional view of a polarization volumetric grating (PVH) usable in a switchable diffuser of this disclosure.

Turning to FIG. 11A, a polarization volume hologram (PVH) grating 1100 may be used e.g. in the switchable diffuser of the display apparatus 100 of FIGS. 1 and 2 and the display apparatus 300 of FIG. 3. The PVH grating 1100 of FIG. 11A includes an LC layer 1104 bound by opposed top 1105 and bottom 1106 parallel surfaces. The LC layer 1104 may include an LC fluid containing rod-like LC molecules 1107 with positive dielectric anisotropy, i.e. nematic LC molecules. A chiral dopant may be added to the LC fluid, causing the LC molecules in the LC fluid to self-organize into a periodic helical configuration including helical structures 1108 extending between the top 1105 and bottom 1106 parallel surfaces of the LC layer 1104. Such a configuration of the LC molecules 1107, termed herein a cholesteric configuration, includes a plurality of helical periods p, e.g. at least two, at least five, at least ten, at least twenty, or at least fifty helical periods p between the top 1105 and bottom 1106 parallel surfaces of the LC layer 1104.

Boundary LC molecules 1107b at the top surface 1105 of the LC layer 1104 may be oriented at an angle to the top surface 1105. The boundary LC molecules 1107b may have a spatially varying azimuthal angle, e.g. linearly varying along X-axis parallel to the top surface 1105, as shown in FIG. 11A. To that end, an alignment layer 1112 may be provided at the top surface 1105 of the LC layer 1104. The alignment layer 1112 may be configured to provide the desired orientation pattern of the boundary LC molecules 1107b, such as the linear dependence of the azimuthal angle on the X-coordinate. A pattern of spatially varying polarization directions of the UV light may be selected to match a desired orientation pattern of the boundary LC molecules 1107b at the top surface 1105 and/or the bottom surface 1106 of the LC layer 1104. When the alignment layer 1112 is coated with the cholesteric LC fluid, the boundary LC molecules 1107b are oriented along the photopolymerized chains of the alignment layer 1112, thus adopting the desired surface orientation pattern. Adjacent LC molecules adopt helical patterns extending from the top 1105 to the bottom 1106 surfaces of the LC layer 1104, as shown.

The boundary LC molecules 1107*b* define relative phases of the helical structures 1108 having the helical period p. The helical structures 1108 form a volume grating comprising helical fringes 1114 tilted at an angle φ, as shown in FIG. 11A. The steepness of the tilt angle φ depends on the rate of variation of the azimuthal angle of the boundary LC molecules 1107*b* at the top surface 1105 and p. Thus, the tilt angle φ is determined by the surface alignment pattern of the boundary LC molecules 1107*b* at the alignment layer 1112. The volume grating has a period $\Lambda_x$ along X-axis and $\Lambda_y$ along Y-axis. In some embodiments, the periodic helical structures 1108 of the LC molecules 1107 may be polymer-stabilized by mixing in a stabilizing polymer into the LC fluid, and curing (polymerizing) the stabilizing polymer.

Figure 11B:
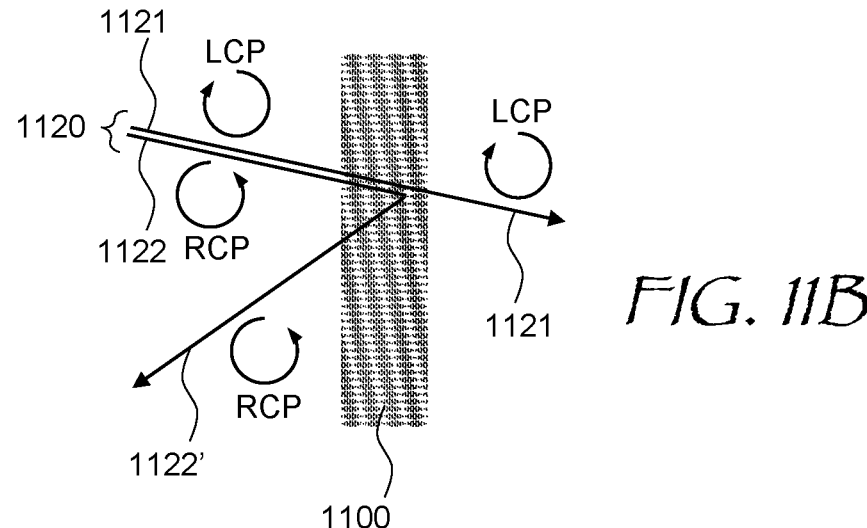
FIG. 11B is a diagram illustrating optical performance of the PVH of FIG. 11A.

The helical nature of the fringes 1114 of the volume grating makes the PVH grating 1100 preferably responsive to light of polarization having one particular handedness, e.g. left- or right-circular polarization, while being substantially non-responsive to light of the opposite handedness of polarization. Thus, the helical fringes 1114 make the PVH grating 1100 polarization-selective, causing the PVH grating 1100 to diffract light of only one handedness of circular polarization. This is illustrated in FIG. 11B, which shows a light beam 1120 impinging onto the PVH grating 1100. The light beam 1120 includes a left circular polarized (LCP) beam component 1121 and a right circular polarized (RCP) beam component 1122. The LCP beam component 1121 propagates through the PVH grating 1100 substantially without diffraction. Herein, the term "substantially without diffraction" means that, even though an insignificant portion of the beam (the LCP beam component 1121 in this case) might diffract, the portion of the diffracted light energy is so small that it does not impact the intended performance of the PVH grating 1100. The RCP beam component 1122 of the light beam 1120 undergoes diffraction, producing a diffracted beam 1122'. The polarization selectivity of the PVH grating 1100 results from the effective refractive index of the grating being dependent on the relationship between the handedness, or chirality, of the impinging light beam and the handedness, or chirality, of the grating fringes 1114. Changing the handedness of the impinging light may be used to switch the performance of the PVH grating 1100. The PVH grating 1100 may also be made tunable by applying voltage to the LC layer 1104, which distorts or erases the above-described helical structure. It is further noted that sensitivity of the PVH 1100 to right circular polarized light in particular is only meant as an illustrative example. When the handedness of the helical fringes 1114 is reversed, the PVH 1100 may be made sensitive to left circular polarized light. Thus, the operation of the PVH 1100 may be controlled by controlling the polarization state of the impinging light beam 1120. The PVH 1100 may be made tunable by application of electric field across the LC layer 1104, which erases the periodic helical structures 1108.

Figure 12A:
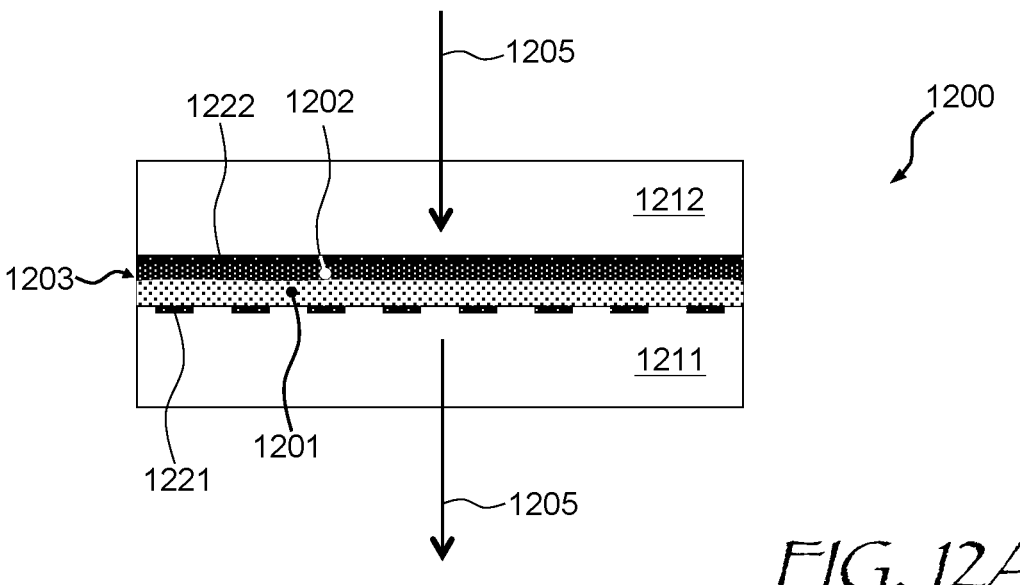
FIG. 12A is a side cross-sectional view of a fluidic grating usable in a switchable diffuser of this disclosure, in an OFF state.
Figure 12B:
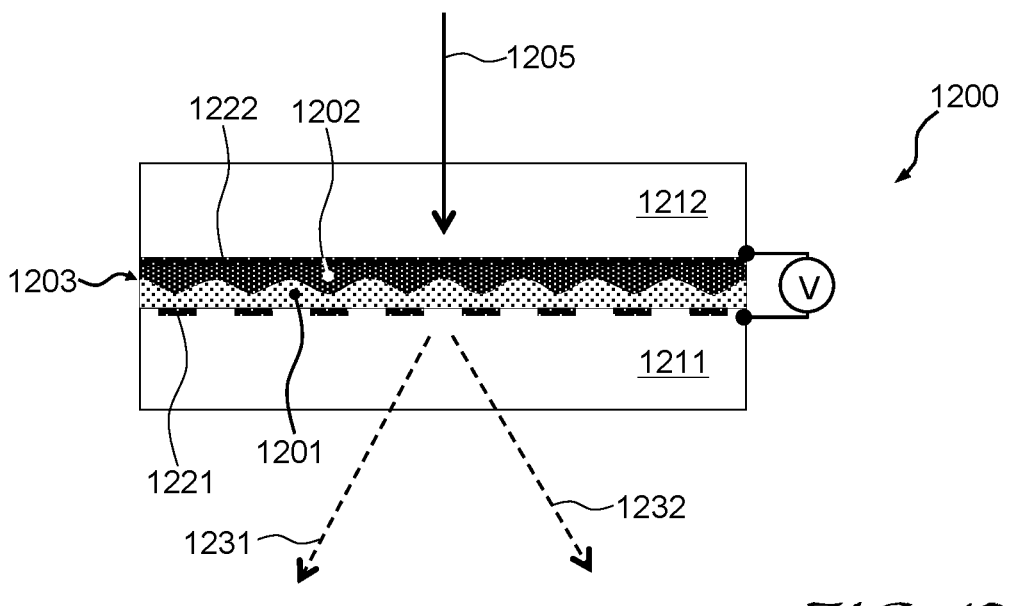
FIG. 12B is a side cross-sectional view of the fluidic grating of FIG. 12A in an ON state.

Referring now to FIGS. 12A and 12B, a fluidic grating 1200 may be used e.g. in the switchable diffuser of the display apparatus 100 of FIGS. 1 and 2 and the display apparatus 300 of FIG. 3. The fluidic grating 1200 includes first 1201 and second 1202 immiscible fluids separated by an inter-fluid boundary 1203. One of the fluids may be a hydrophobic fluid such as oil, e.g. silicone oil, while the other fluid may be water-based. One of the first 1201 and second 1202 fluids may be a gas in some embodiments. The first 1201 and second 1202 fluids may be contained in a cell formed by first 1211 and second 1212 substrates supporting first 1221 and second 1222 electrode structures. The first 1221 and/or second 1222 electrode structures may be at least partially transparent, absorptive, and/or reflective.

At least one of the first 1221 and second 1222 electrode structures may be patterned for imposing a spatially variant electric field onto the first 1201 and second 1202 fluids. For example, in FIGS. 12A and 12B, the first electrode 1221 is patterned, and the second electrodes 1222 is not patterned, i.e. the second electrodes 1222 is a backplane electrode. In the embodiment shown, both the first 1221 and second 1222 electrodes are substantially transparent. For example, the first 1221 and second 1222 electrodes may be indium tin oxide (ITO) electrodes.

FIG. 12A shows the fluidic grating 1200 in a non-driven state when no electric field is applied across the inter-fluid boundary 1203. When no electric field is present, the inter-fluid boundary 1203 is straight and smooth; accordingly, a light beam 1205 impinging onto the fluidic grating 1200 does not diffract, propagating right through as illustrated. FIG. 12B shows the fluidic grating 1200 in a driven state when a voltage V is applied between the first 1221 and second 1222 electrodes, producing a spatially variant electric field across the first 1201 and second 1202 fluids separated by the inter-fluid boundary 1203.

The application of the spatially variant electric field causes the inter-fluid boundary 1203 to distort as illustrated in FIG. 12B, forming a periodic variation of effective refractive index, i.e. a surface-relief diffraction grating. The light beam 1205 impinging onto the fluidic grating 1200 will diffract, forming first 1231 and second 1232 diffracted sub-beams. By varying the amplitude of the applied voltage V, the strength of the fluidic grating 1200 may be varied. By applying different patterns of the electric field e.g. with individually addressable sub-electrodes or pixels of the first electrode 1221, the grating period and, accordingly, the diffraction angle, may be varied. More generally, varying the effective voltage between separate sub-electrodes or pixels of the first electrode 1221 may result in a three-dimensional conformal change of the fluidic interface i.e. the inter-fluid boundary 1203 inside the fluidic volume to impart a desired optical response to the fluidic grating 1200. The applied voltage pattern may be pre-biased to compensate or offset gravity effects, i.e. gravity-caused distortions of the inter-fluid boundary 1203.

Portions of a patterned electrode may be individually addressable. In some embodiments, the patterned electrode 1221 may be replaced with a continuous, non-patterned electrode coupled to a patterned dielectric layer for creating a spatially non-uniform electric field across the first 1201 and second 1202 fluids. Also in some embodiments, the backplane electrode is omitted, and the voltage is applied between the segmented electrodes themselves.

The thickness of the first 1221 and second 1222 electrodes may be e.g. between 10 nm and 50 nm. The materials of the first 1221 and second 1222 electrodes besides ITO may be e.g. indium zinc oxide (IZO), zinc oxide (ZO), indium oxide (IO), tin oxide (TO), indium gallium zinc oxide (IGZO), etc. The first 1201 and second 1202 fluids may have a refractive index difference of at least 0.1, and may be as high as 0.2 and higher. One of the first 1201 or second 1202 fluids may include polyphenylether, 1,3-bis(phenylthio)benzene, etc. The first 1211 and/or second 1212 substrates may include e.g. fused silica, quartz, sapphire, etc. The first 1211 and/or second 1212 substrates may be straight or curved, and may include vias and other electrical interconnects. The applied voltage may be varied in amplitude and/or duty cycle when applied at a frequency of between 100 Hz and 100 kHz. The applied voltage can change polarity and/or be bipolar. Individual first 1201 and/r second 1202 fluid layers may have a thickness of between 0.5-5 micrometers, more preferably between 0.5-2 micrometer.

To separate the first 1201 and second 1202 fluids, surfactants containing one hydrophilic end functional group and one hydrophobic end functional group may be used. The examples of a hydrophilic end functional group are hydroxyl, carboxyl, carbonyl, amino, phosphate, sulfhydryl. The hydrophilic functional groups may also be anionic groups such as sulfate, sulfonate, carboxylates, phosphates, for example. Non-limiting examples of a hydrophobic end functional group are aliphatic groups, aromatic groups, fluorinated groups. For example, when polyphenyl thioether and fluorinated fluid may be selected as a fluid pair, a surfactant containing aromatic end group and fluronirated end group may be used. When phenyl silicone oil and water are selected as the fluid pair, a surfactant containing aromatic end group and hydroxyl (or amino, or ionic) end group may be used. These are only non-limiting examples.

Figure 13A:
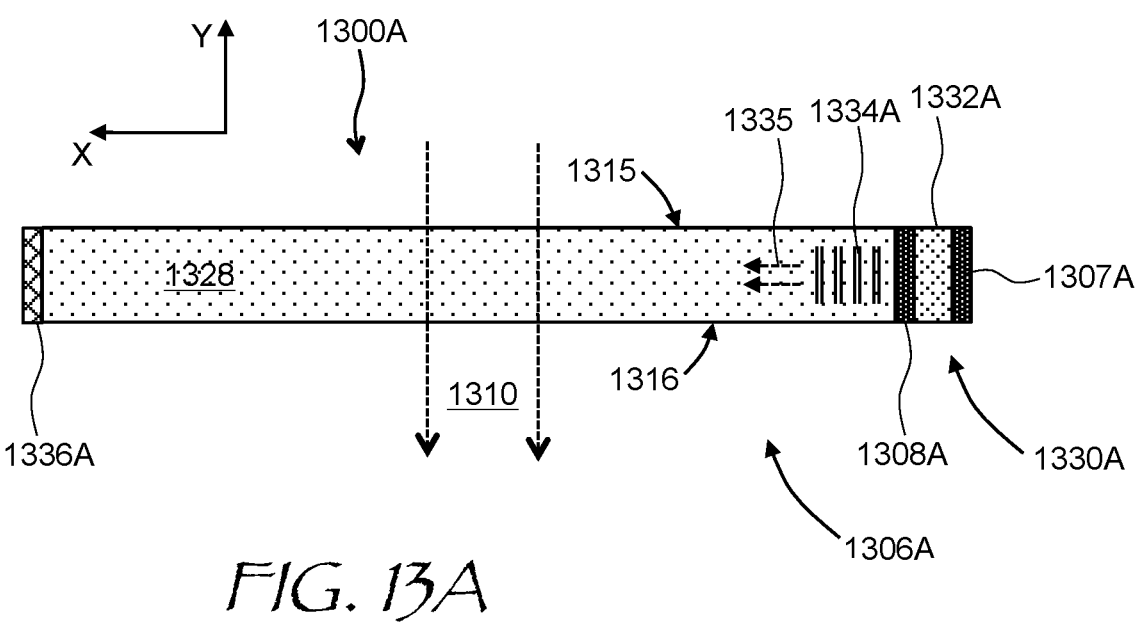
FIG. 13A is a side cross-sectional view of a switchable diffuser of this disclosure including an acoustic actuator for creating a volume acoustic wave.

Referring to FIG. 13A, an acoustic redirector 1300A may be used e.g. in the switchable diffuser of the display apparatus 100 of FIGS. 1 and 2 and the display apparatus 300 of FIG. 3. The acoustic redirector 1300A includes a body 1306A having two portions, a substrate 1328 for propagating an illuminating light beam 1310, and a volume-wave acoustic actuator 1330A mechanically coupled at a side of the substrate 1328 joining its top 1315 and bottom 1316 surfaces. In the embodiment shown, the volume-wave acoustic actuator 1330A includes an electrically responsive layer 1332A, e.g. a piezoelectric layer, disposed between electrodes 1307A, 1308A.

In operation, an electrical signal at a high frequency, typically in the range of 1 MHz to 100 MHz or higher, is applied to the electrodes 1307A, 1308A causing the electrically responsive layer 1332A to oscillate, typically at a frequency of a mechanical resonance of the electrically responsive layer 1332A. The oscillating thickness of the electrically responsive layer 1332A creates a volume acoustic wave 1334A propagating in the substrate 1328 in a direction 1335, i.e. along the X-axis. The volume acoustic wave 1334A modulates the refractive index of the substrate 1328 due to the effect of photoelasticity. The modulated refractive index creates a diffraction grating that redirects and/or splits the illuminating light beam 1310. By changing the strength of the electric signal applied to the volume-wave acoustic actuator 1330A, the strength of the out-coupling grating may be changed. The out-coupling grating may be switched ON and OFF by switching ON and OFF the oscillating electric signal. The grating period may be changed by changing the frequency of the oscillating electric signal. In some embodiments, an acoustic wave terminator 1336A can be coupled to an opposite side of the substrate 1328 to absorb the volume acoustic wave 1334A and thus prevent a standing acoustic wave formation in the substrate 1328.

Figure 13B:
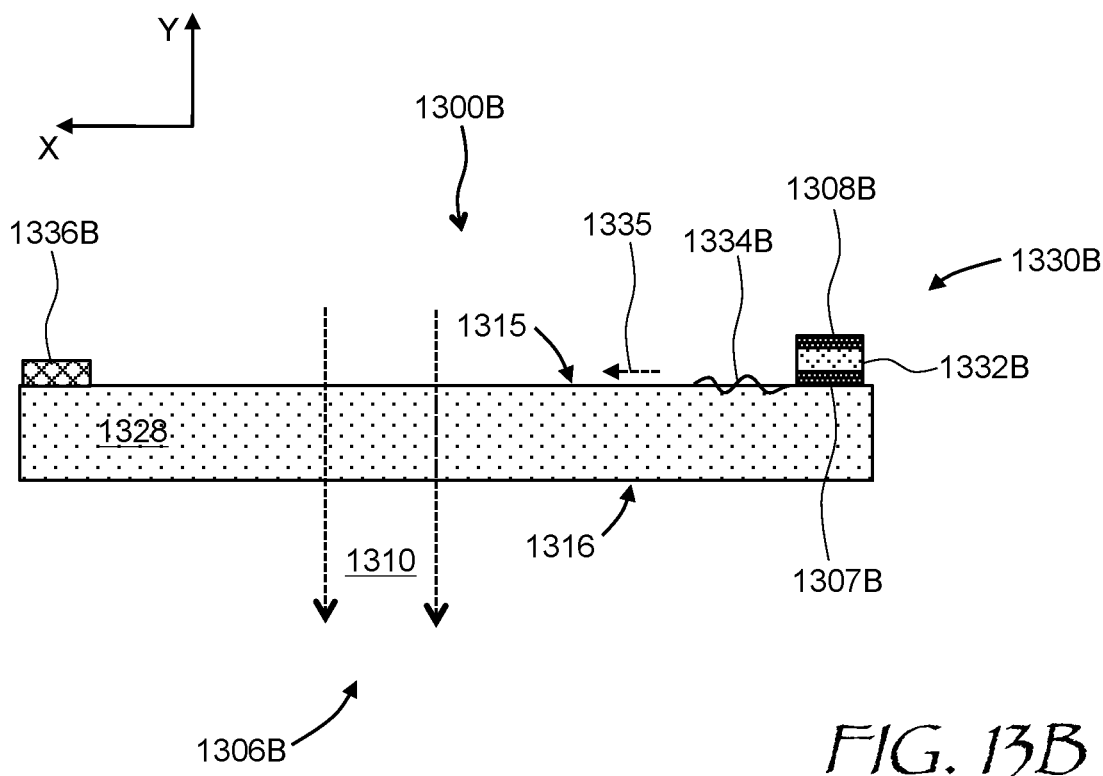
FIG. 13B is a side cross-sectional view of a switchable diffuser of this disclosure including an acoustic actuator for creating a surface acoustic wave.

Turning to FIG. 13B, an acoustic redirector 1300B may be used e.g. in the switchable diffuser of the display apparatus 100 of FIGS. 1 and 2 and the display apparatus 300 of FIG. 3. The acoustic redirector 1300A includes a waveguide body 1306B having two portions, the substrate 1328 for propagating the illuminating light beam 1310, and a surface-wave acoustic actuator 1330B mechanically coupled at the top surface 1315. Alternatively, the surface-wave acoustic actuator 1330B may also be coupled at the bottom surface 1316. In the embodiment shown, the surface-wave acoustic actuator 1330B includes an electrically responsive layer 1332B, e.g. a piezoelectric layer, disposed between electrodes 1307B, 1308B.

In operation, an electrical signal at a high frequency, typically in the range of 1 MHz to 100 MHz or higher, is applied to the electrodes 1307B,1308B causing the electrically responsive layer 1332B to oscillate. The oscillation of the electrically responsive layer 1332A creates a surface acoustic wave 1334B propagating in the substrate 1328 in the direction 1335, i.e. along the X-axis. The surface acoustic wave 1334B forms a diffraction grating that redirects and/or splits the illuminating light beam 1310. By changing the strength of the electric signal applied to the surface-wave acoustic actuator 1330B, the strength of the surface grating may be changed. The surface grating may be switched ON and OFF by switching ON and OFF the oscillating electric signal. The grating period may be changed by changing the frequency of the oscillating electric signal. In some embodiments, an acoustic wave terminator 1336B can be coupled to an opposite side of the substrate 1328 at the same surface, i.e. at the top surface 1315 in FIG. 13B, to absorb the surface acoustic wave 1334B and thus prevent a standing acoustic wave formation.

Some switchable gratings include a material with tunable refractive index. By way of a non-limiting example, a holographic polymer-dispersed liquid crystal (H-PDLC) grating may be manufactured by causing interference between two coherent laser beams in a photosensitive monomer/liquid crystal (LC) mixture contained between two substrates coated with a conductive layer. Upon irradiation, a photoinitiator contained within the mixture initiates a free-radical reaction, causing the monomer to polymerize. As the polymer network grows, the mixture phase separates into polymer-rich and liquid-crystal rich regions. The refractive index modulation between the two phases causes light passing through the cell to be scattered in the case of traditional PDLC or diffracted in the case of H-PDLC. When an electric field is applied across the cell, the index modulation is removed and light passing through the cell is unaffected. This is described in an article entitled "Electrically Switchable Bragg Gratings from Liquid Crystal/Polymer Composites" by Pogue et al., Applied Spectroscopy, v. 54 No. 1, 2000, which is incorporated herein by reference in its entirety.

Tunable or switchable gratings with a variable grating period may be produced e.g. by using flexoelectric LC. For LCs with a non-zero flexoelectric coefficient difference (e1-e3) and low dielectric anisotropy, electric fields exceeding certain threshold values result in transitions from the homogeneous planar state to a spatially periodic one. Field-induced grating is characterized by rotation of the LC director about the alignment axis with the wavevector of the grating oriented perpendicular to the initial alignment direction. The rotation sign is defined by both the electric field vector and the sign of the (e1-e3) difference. The wavenumber characterizing the field-induced periodicity is increased linearly with the applied voltage starting from a threshold value of about n/d, where d is the thickness of the layer. A description of flexoelectric LC gratings may be found e.g. in an article entitled "Dynamic and Photonic Properties of Field-Induced Gratings in Flexoelectric LC Layers" by Palto in Crystals 2021, 11, 894, which is incorporated herein by reference in its entirety.

Tunable gratings with a variable grating period or a slant angle may be provided e.g. by using helicoidal LC. Tunable gratings with helicoidal LCs have been described e.g. in an article entitled "Electrooptic Response of Chiral Nematic Liquid Crystals with Oblique Helicoidal Director" by Xiang et al. Phys. Rev. Lett. 112, 217801, 2014, which is incorporated herein by reference in its entirety.

For gratings exhibiting strong wavelength dependence of grating efficiency, several gratings, e.g. several volumetric Bragg grating (VBG) gratings, may be provided in the lightguide. The gratings that diffract light at any given moment of time may be switched by switching the VBG grating on and off, and/or by switching the wavelength of the light propagating in the waveguide.

Figure 14:
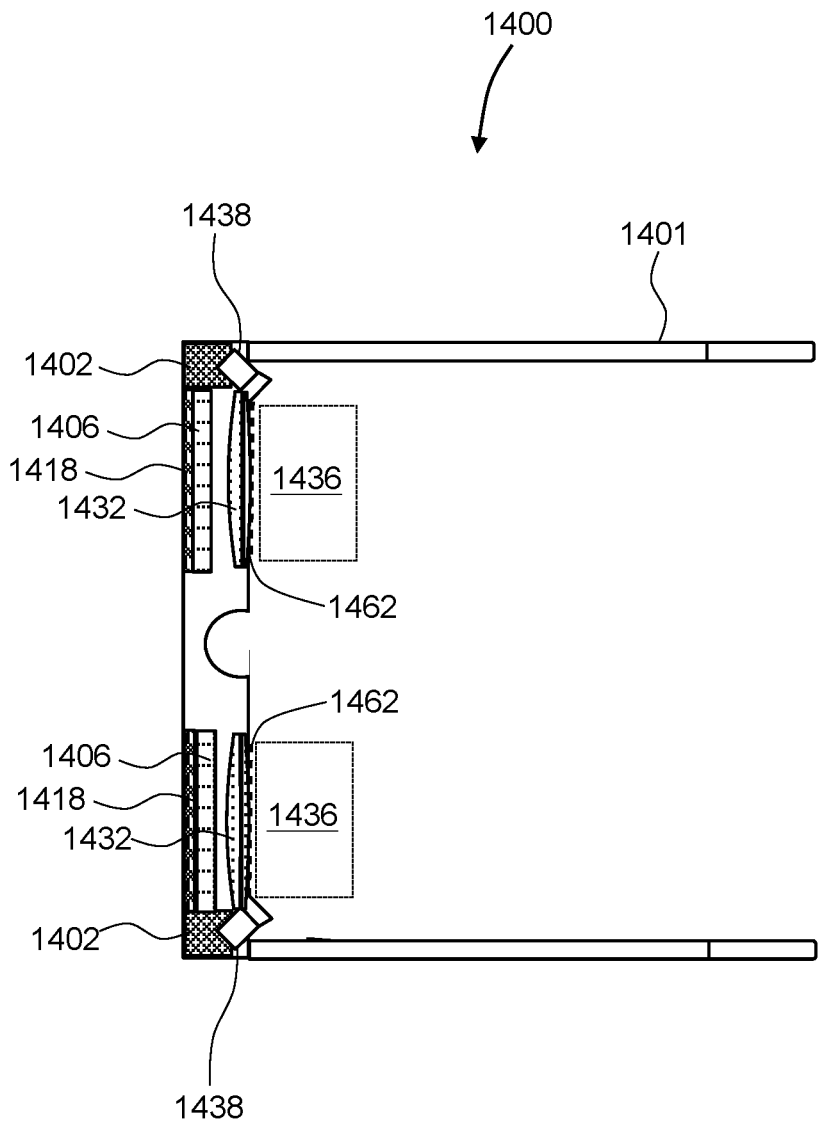
FIG. 14 is a view of a virtual reality (VR) display of this disclosure having a form factor of a pair of eyeglasses.

Referring now to FIG. 14, a virtual reality (VR) near-eye display (NED) 1400 is one possible implementation of a display apparatus of this disclosure. The VR NED 1400 includes a frame 1401 supporting, for each eye: a light source 1402 including a switchable diffuser and/or a tiltable reflector for varying a divergence and/or angle of propagation of an illuminating light beam as disclosed herein; a pupil-replicating lightguide 1406 for guiding the illuminating light beam inside and out-coupling portions of the illuminating light beam as disclosed herein; a reflective display panel 1418 illuminated by the light beam portions out-coupled from the pupil-replicating lightguide 1406 for spatially modulating the light beam portions; an objective or collimator 1432 for converting an image in linear domain displayed by the display panel 1418 into an image in angular domain at an eyebox 1436 as disclosed herein; an eye-tracking camera 1438; and a plurality of eyebox illuminators 1462, shown as black dots. The eyebox illuminators 1462 may be supported by the objective 1432 for illuminating an eyebox 1436.

The purpose of the eye-tracking cameras 1438 is to determine position and/or orientation of both eyes of the user to enable steering the output image light to the locations of the user's eyes as disclosed herein. The illuminators 1462 illuminate the eyes at the corresponding eyeboxes 1436, to enable the eye-tracking cameras 1438 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1462, the light illuminating the eyeboxes 1436 may be made invisible to the user. For example, infrared light may be used to illuminate the eyeboxes 1436.

Figure 15:
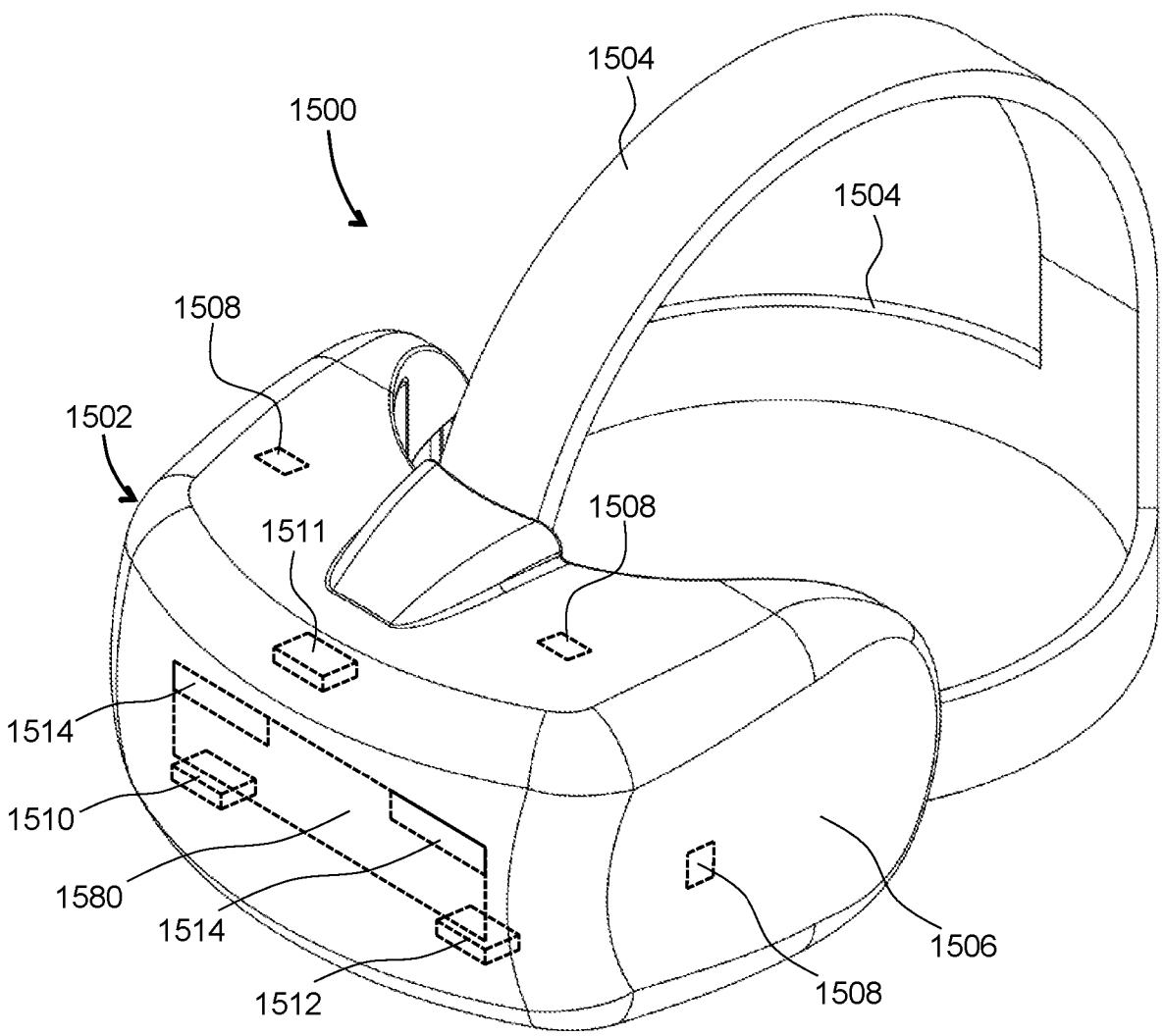
FIG. 15 is a three-dimensional view of a head-mounted display (HMD) of this disclosure.

Turning to FIG. 15, an HMD 1500 is an example of an AR/VR wearable display system which encloses the user's face, for a greater degree of immersion into the AR/VR environment. The HMD 1500 may generate the entirely virtual 3D imagery. The HMD 1500 may include a front body 1502 and a band 1504 that can be secured around the user's head. The front body 1502 is configured for placement in front of eyes of a user in a reliable and comfortable manner. A display system 1580 may be disposed in the front body 1502 for presenting AR/VR imagery to the user. The display system 1580 may include any of the display apparatuses and directional illuminators disclosed herein. Sides 1506 of the front body 1502 may be opaque or transparent.

In some embodiments, the front body 1502 includes locators 1508 and an inertial measurement unit (IMU) 1510 for tracking acceleration of the HMD 1500, and position sensors 1512 for tracking position of the HMD 1500. The IMU 1510 is an electronic device that generates data indicating a position of the HMD 1500 based on measurement signals received from one or more of position sensors 1512, which generate one or more measurement signals in response to motion of the HMD 1500. Examples of position sensors 1512 include: one or more accelerometers, one or more gyroscopes, one or more magnetometers, another suitable type of sensor that detects motion, a type of sensor used for error correction of the IMU 1510, or some combination thereof. The position sensors 1512 may be located external to the IMU 1510, internal to the IMU 1510, or some combination thereof.

The locators 1508 are traced by an external imaging device of a virtual reality system, such that the virtual reality system can track the location and orientation of the entire HMD 1500. Information generated by the IMU 1510 and the position sensors 1512 may be compared with the position and orientation obtained by tracking the locators 1508, for improved tracking accuracy of position and orientation of the HMD 1500. Accurate position and orientation is important for presenting appropriate virtual scenery to the user as the latter moves and turns in 3D space.

The HMD 1500 may further include a depth camera assembly (DCA) 1511, which captures data describing depth information of a local area surrounding some or all of the HMD 1500. The depth information may be compared with the information from the IMU 1510, for better accuracy of determination of position and orientation of the HMD 1500 in 3D space.

The HMD 1500 may further include an eye tracking system 1514 for determining orientation and position of user's eyes in real time. The obtained position and orientation of the eyes also allows the HMD 1500 to determine the gaze direction of the user and to adjust the image generated by the display system 1580 accordingly. The determined gaze direction and vergence angle may be used to adjust the display system 1580 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1502.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display apparatus comprising:
a display panel for displaying an image;
a light source for providing an illuminating light beam;
a switchable diffuser coupled to the light source for imparting, to the illuminating light beam, at least one of:
a spatially variant amplitude by continuously tuning a magnitude of an amplitude of the illuminating light beam; or
a spatially variant phase delay by continuously tuning a magnitude of a phase delay of the illuminating light beam;
a lightguide coupled to the switchable diffuser for conveying the illuminating light beam propagated through the switchable diffuser to the display panel, whereby the display panel provides an image light beam carrying the image; and
an objective for receiving and conveying the image light beam to an eyebox of the display apparatus for viewing the image at the eyebox.

2. The display apparatus of claim 1, further comprising:
an eye tracker for determining a size of a pupil of an eye at the eyebox; and
a controller operably coupled to the eye tracker and the switchable diffuser and configured to cause the switchable diffuser to increase a divergence of the illuminating light beam for the image light beam to correspond to the pupil size determined by the eye tracker.

3. The display apparatus of claim 1, wherein the at least one of a spatially variant amplitude or spatially variant phase delay is time-varying, the display apparatus further comprising a controller operably coupled to the switchable diffuser and configured to cause the switchable diffuser to increase a time-averaged divergence of the illuminating light beam.

4. The display apparatus of claim 3, wherein at least one of: the switchable diffuser comprises a grating switched at a frequency of at least 5 kHz; or the switchable diffuser increases a time-averaged divergence of the illuminating light beam by at least one degree.

5. The display apparatus of claim 3, further comprising an eye tracker for determining at least one of a position or a size of a pupil of an eye at the eyebox, wherein the controller is operably coupled to the eye tracker;
wherein the controller is configured to cause the switchable diffuser to at least one of: redirect the illuminating light beam in an oscillating manner to increase the time-averaged divergence of the illuminating light beam for the image light beam to correspond to the pupil size; or to redirect the illuminating light beam for the image light beam to shift toward the pupil position determined by the eye tracker.

6. The display apparatus of claim 1, further comprising:
an eye tracker for determining a position of a pupil of an eye at the eyebox;
a tiltable reflector for redirecting the illuminating light beam before the illuminating light beam impinges onto the lightguide; and
a controller operably coupled to the eye tracker and the tiltable reflector and configured to cause the tiltable reflector to redirect the illuminating light beam for the image light beam to follow the position of the pupil determined by the eye tracker.

7. The display apparatus of claim 1, wherein the display panel comprises a reflective display panel, and wherein the lightguide is disposed between the display panel and the objective, such that in operation, the image light propagates through the lightguide and the objective towards the eyebox.

8. The display apparatus of claim 1, wherein the lightguide comprises a pupil-replicating lightguide for expanding the illuminating light beam across the display panel.

9. The display apparatus of claim 1, wherein the switchable diffuser comprises at least one of: a switchable polarization volume hologram; or a switchable Pancharatnam-Berry phase (PBP) liquid crystal (LC) grating.

10. The display apparatus of claim 1, wherein the switchable diffuser comprises a switchable liquid crystal (LC) grating comprising a polymer-based surface-relief grating structure.

11. The display apparatus of claim 10, wherein the polymer-based surface-relief grating structure comprises a birefringent polymer.

12. The display apparatus of claim 1, wherein the switchable diffuser comprises a fluidic grating.

13. The display apparatus of claim 1, further comprising at least one of:
a surface-wave acoustic actuator coupled to the lightguide, wherein the switchable diffuser comprises a surface acoustic wave formed by the surface-wave acoustic actuator in the lightguide; or
a volume-wave acoustic actuator coupled to the lightguide, wherein the switchable diffuser comprises a volume acoustic wave formed by the volume-wave acoustic actuator in the lightguide.

14. The display apparatus of claim 1, wherein the switchable diffuser comprises a grating having an optical retardation modulated at a peak-to-peak amplitude of at least 150 nm.

* * * * *